(12) United States Patent
Inoue et al.

(10) Patent No.: US 8,102,468 B2
(45) Date of Patent: Jan. 24, 2012

(54) DISPLAY DEVICE AND DISPLAY METHOD

(75) Inventors: Masutaka Inoue, Hirakata (JP);
Tomoya Terauchi, Daito (JP)

(73) Assignee: SANYO Electric Co., Ltd., Moriguchi (JP)

( * ) Notice: Subject to any disclaimer, the term of this patent is extended or adjusted under 35 U.S.C. 154(b) by 536 days.

(21) Appl. No.: 12/361,775

(22) Filed: Jan. 29, 2009

(65) Prior Publication Data

US 2009/0201415 A1 Aug. 13, 2009

(30) Foreign Application Priority Data

Jan. 29, 2008 (JP) ................... 2008-017886
Jan. 20, 2009 (JP) ................... 2009-010263

(51) Int. Cl.
*H04N 7/01* (2006.01)
*H04N 11/20* (2006.01)
(52) U.S. Cl. ......... 348/441; 348/453; 348/459; 348/452
(58) Field of Classification Search .................. 348/441, 348/443, 444, 458, 459, 448, 450, 451–453, 348/699–701; *H04N 7/01, 11/20, 5/14, 9/64*
See application file for complete search history.

(56) References Cited

U.S. PATENT DOCUMENTS

2004/0017852 A1* 1/2004 Garrido et al. ........... 375/240.16
2009/0167959 A1* 7/2009 Nakamura et al. ............ 348/699

FOREIGN PATENT DOCUMENTS

JP  2006-203463 A  8/2006

* cited by examiner

*Primary Examiner* — Sherrie Hsia
(74) *Attorney, Agent, or Firm* — NDQ&M Watchstone LLP

(57) ABSTRACT

A display device includes: a display unit including a plurality of pixels each including a plurality of sub-pixels; an acquisition unit configured to acquire a numbers of sub-pixels corresponding to an amount of motion of a target image between a plurality of reference original frames; an allocating unit configured to allocate the numbers of sub-pixels acquired by the acquisition unit to an interpolated frame, in accordance with an order of the interpolated frame to be interposed between the plurality of reference original frames; and a generating unit configured to generate the interpolated frame, in accordance with the numbers of sub-pixels allocated by the allocating unit.

5 Claims, 20 Drawing Sheets

FIG. 4A
ORIGINAL FRAME (n)
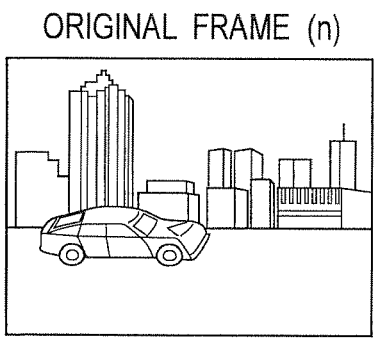
FIG. 4B
ORIGINAL FRAME (n+1)
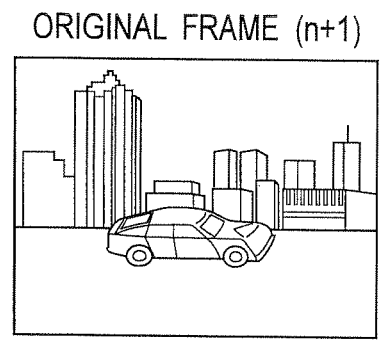
FIG. 4C
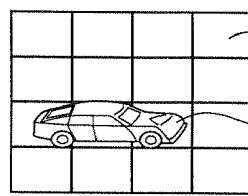
FIG. 4D
STATIC AREA
MOTION AREA
FIG. 4E
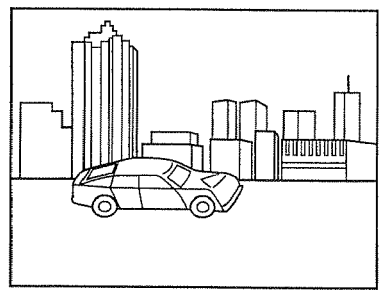
MOTION INTERPOLATED FRAME

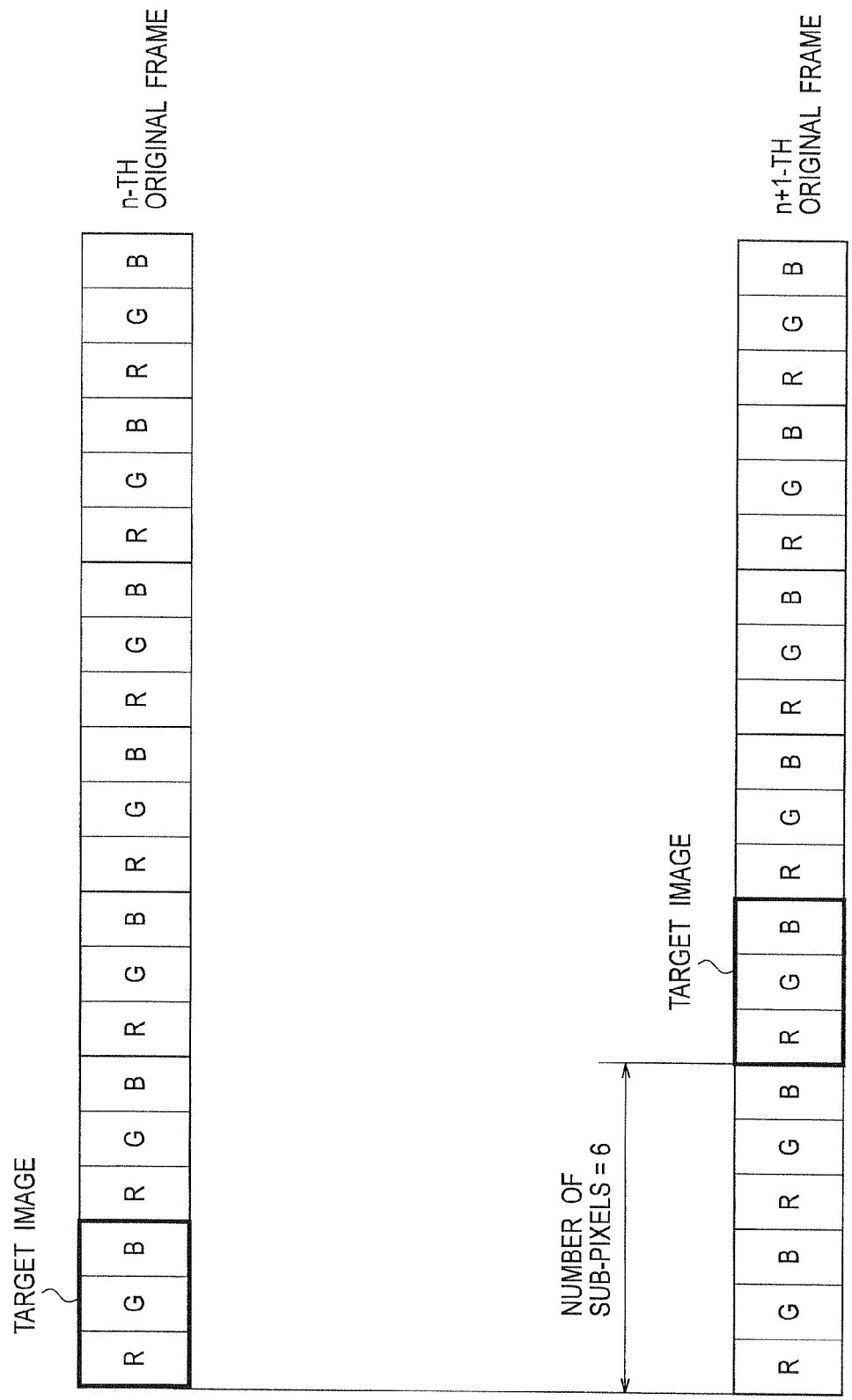

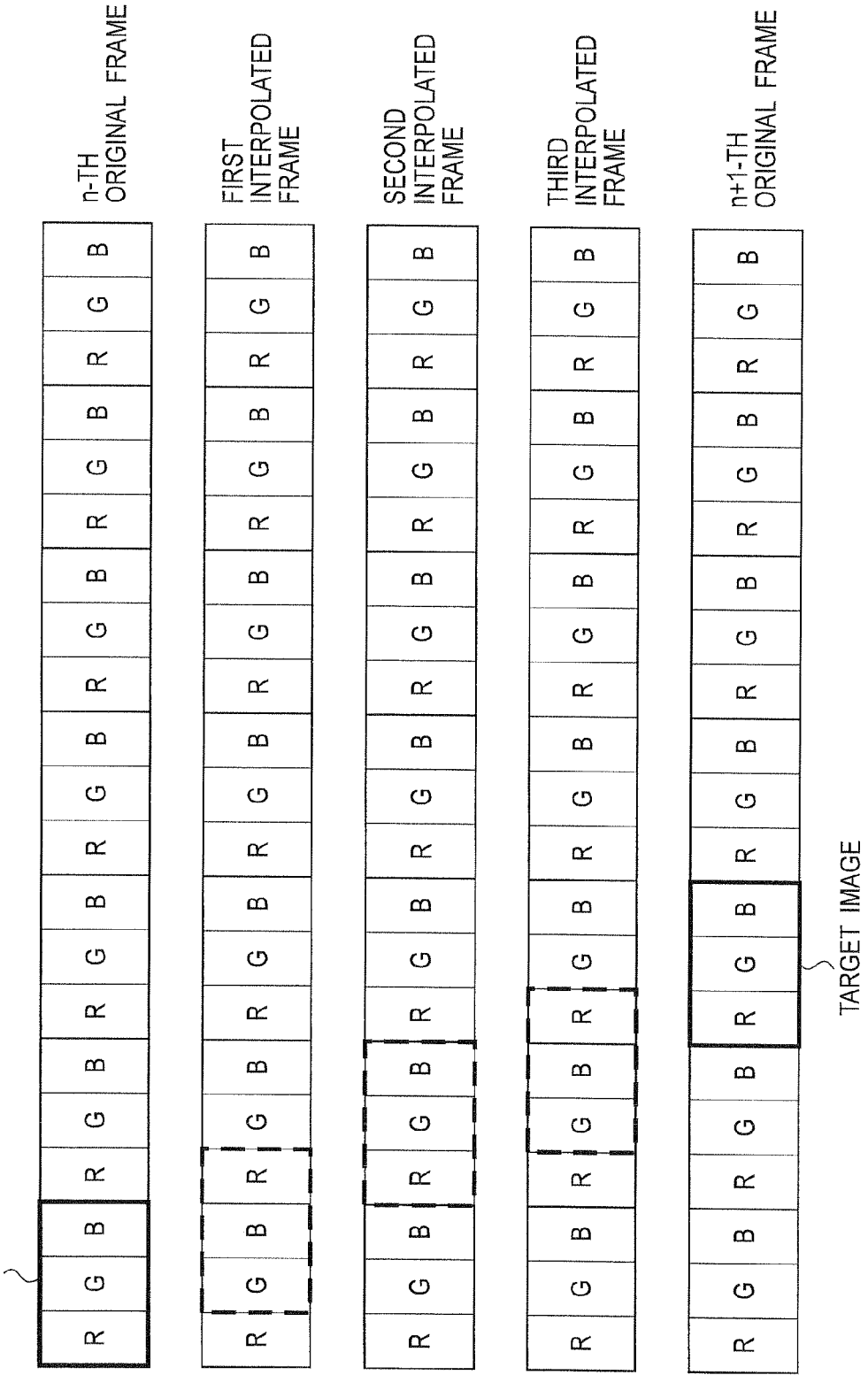

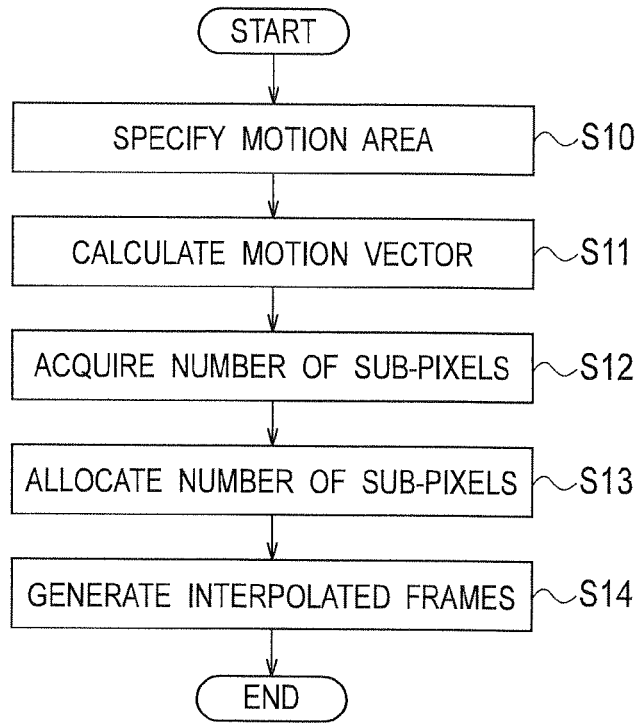
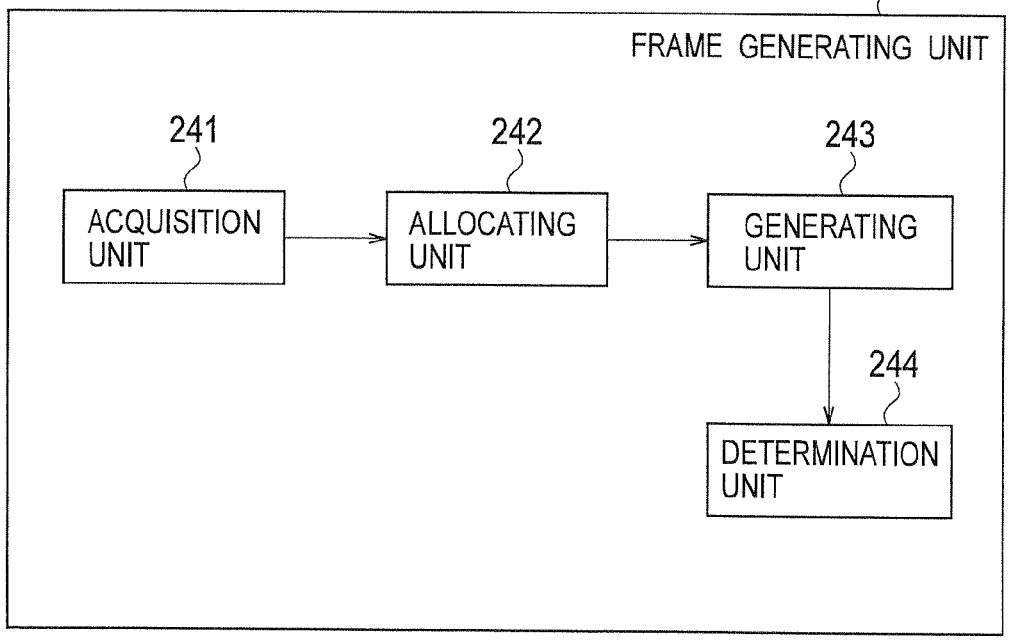

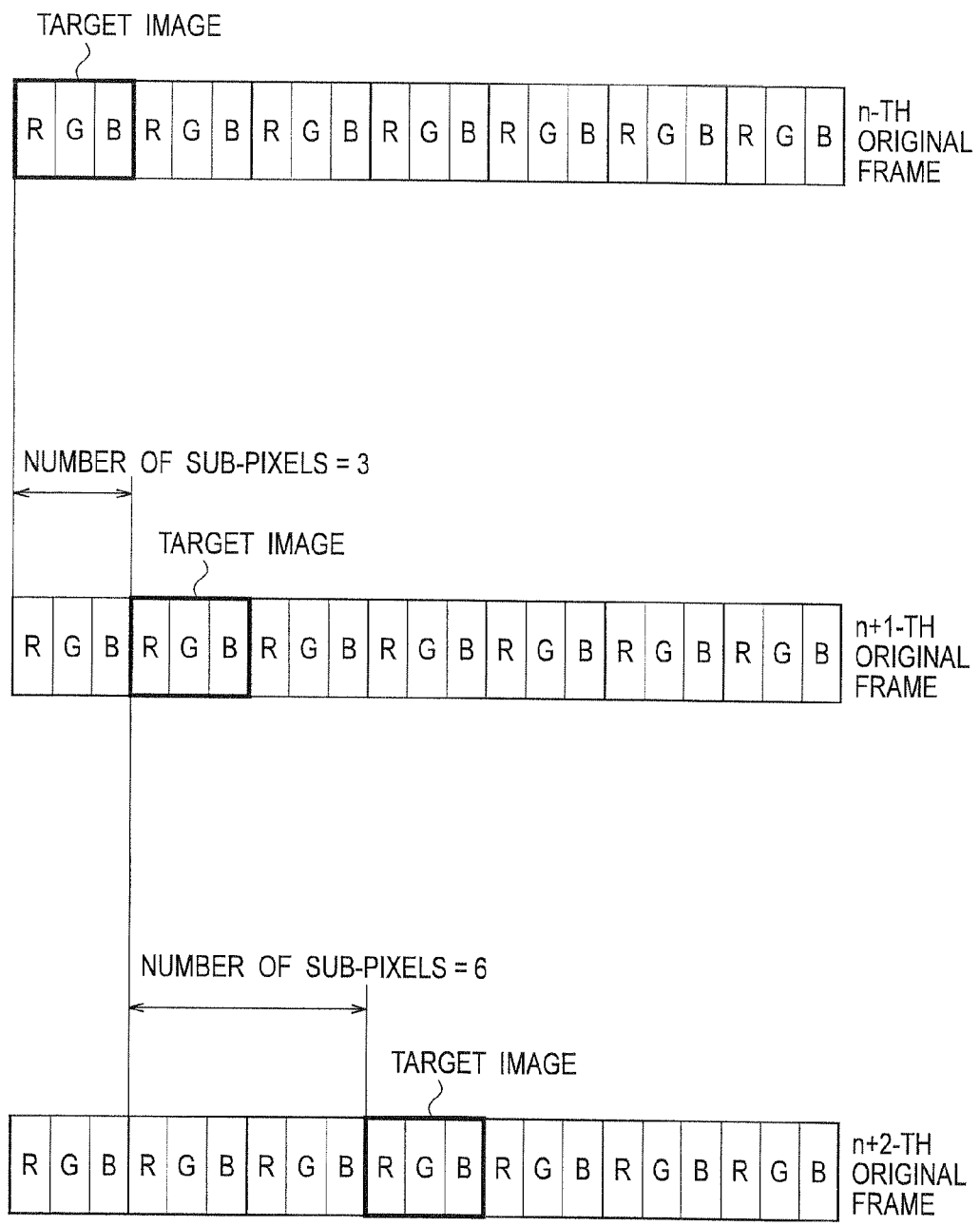

FIG. 18

DISPLAY TRAJECTORY

TARGET IMAGE n-TH ORIGINAL FRAME

FIRST INTERPOLATED FRAME

SECOND INTERPOLATED FRAME

THIRD INTERPOLATED FRAME n+1-TH ORIGINAL FRAME

DISPLAY DEVICE AND DISPLAY METHOD

CROSS REFERENCE TO RELATED APPLICATIONS

This application is based upon and claims the benefit of priority from prior Japanese Patent Application No. 2008-17886, fled on Jan. 29, 2008; and Japanese Patent Application No. 2009-010263, filed on Jan. 20, 2009; the entire contents of which are incorporated herein by reference.

BACKGROUND OF THE INVENTION

1. Field of the Invention

The present invention relates to a display device and a display method for displaying a video image at multiple times an original frame rate by using original frames and an interpolated frame.

2. Description of the Related Art

In order to display frames at n-times the frame rate, a technique for generating n–1 pieces of interpolated frames based on original frames (hereinafter referred to as a frame interpolation technique) has been known.

In general, a display includes multiple pixels. Each pixel includes sub-pixels in multiple colors (red, green, and blue, for example).

In the above-described frame interpolation technique, an amount of motion of a target image between multiple original frames is detected. Subsequently, an interpolated frame containing the target image moved on the pixel basis according to the amount of motion of the target image is generated.

In the field of the image stabilization technique, there has been proposed an image control for performing image stabilization on the sub-pixel basis (Japanese Patent Publication No. 2006-203463, for example)

As described above, in the frame interpolation technique, the interpolated frame containing the target image moved on the pixel basis according to the amount of motion of the target image is generated.

Depending on the balance between the increased frame rate (i.e. the number of interpolated frames) and the amount of motion of the target image, a video image formed by the original frames and the interpolated fames does not flow smoothly in some cases.

SUMMARY OF THE INVENTION

A display device in a first aspect displays a video image at multiple times an original frame rate by use of original frames and an interpolated frame. The display device includes: a display unit (a display 40) including multiple pixels each including multiple sub-pixels; an acquisition unit (an acquisition unit 241) configured to acquire the numbers of sub-pixels corresponding to an amount of motion of a target image between a plurality of reference original frames which are the original frames to be used for reference upon generation of the interpolated frame; an allocating unit (an allocating unit 242) configured to allocate the number of sub-pixels acquired by the acquisition unit to the interpolated frame, in accordance with the order of the interpolated frame to be interposed between the plurality of reference original frames; and a generating unit (a generating unit 243) configured to generate the interpolated frame in accordance with the numbers of sub-pixels allocated by the allocating unit.

According to this aspect, the allocating unit allocates the numbers of sub-pixels acquired by the acquisition unit, to the interpolated frame, in accordance with the order of the interpolated frame to be interposed between the plurality of reference original frames. The generating unit generates the interpolated frame in accordance with the numbers of sub-pixels allocated by the allocating unit. That is to say, the interpolated frame are generated on the sub-pixel basis which is finer than the pixel basis, thereby suppressing non-smoothness of a video image displayed at multiple times the original frame rate.

In the first aspect, the allocating unit allocates the number of sub-pixels acquired by the acquisition unit to an intermediate original frame, in accordance with the order of the intermediate original frames, the intermediate original frame being the original frame interposed between the plurality of reference original frames. The generating unit generates a corrected original frame corresponding to the intermediate original frame in accordance with the numbers of sub-pixels allocated to the intermediate original frame.

In the first aspect, the display device further includes a determination unit (a determination unit 244) configured to determine whether to use the intermediate original frame or the corrected original frame. The acquisition unit acquires a gap amount of the target image between the intermediate original frame and the corrected original frame. The determination unit determines to use the corrected original frame when the gap amount acquired by the acquisition unit is smaller than a predetermined threshold, and determines to use the intermediate original frame when the gap amount acquired by the acquisition unit is larger than the predetermined threshold.

In the first aspect, the generating unit generates video image output signals for each of the plurality of pixels, based on video image input signals for each of the plurality of pixels. The generating unit adjusts the video image output signals of pixel corresponding to the target image included in the interpolated frame, based on the video image input signals of the pixel corresponding to the target image included in the interpolated frame.

A display method in a second aspect is for displaying a video image at multiple times an original frame rate by use of original frames and an interpolated frame on a display device having a display unit including a plurality of pixels each including a plurality of sub-pixels. The display method includes: a step A of acquiring the numbers of sub-pixels corresponding to an amount of motion of a target image between a plurality of reference original frames which are the original frames to be used for reference upon generation of the interpolated frame; a step B of allocating the numbers of sub-pixels acquired in the step A to the interpolated frame, in accordance with the order of the interpolated frame to be interposed between the plurality of reference original frames; and a step C of generating the interpolated frame in accordance with the numbers of sub-pixels allocated in the step B.

BRIEF DESCRIPTION OF THE DRAWINGS

FIGS. 4A to 4E are views for explaining generation of interpolated flames according to the first embodiment.

FIG. 6 is a view for explaining allocation of the number of sub-pixels according to the first embodiment.

FIG. 7 is a view for explaining allocation of the numbers of sub-pixels according to the first embodiment.

FIG. 8 is a flowchart showing operations of the display device 100 according to the first embodiment.

FIG. 9 is a block diagram showing a configuration of the frame generating unit 24 according to a second embodiment of the present invention.

FIG. 10 is a view for explaining allocation of the numbers of sub-pixels according to the second embodiment.

FIG. 18 is a view showing a display trajectory of a target image according to a comparative example.

DETAILED DESCRIPTION OF THE EMBODIMENTS

Figure 1:
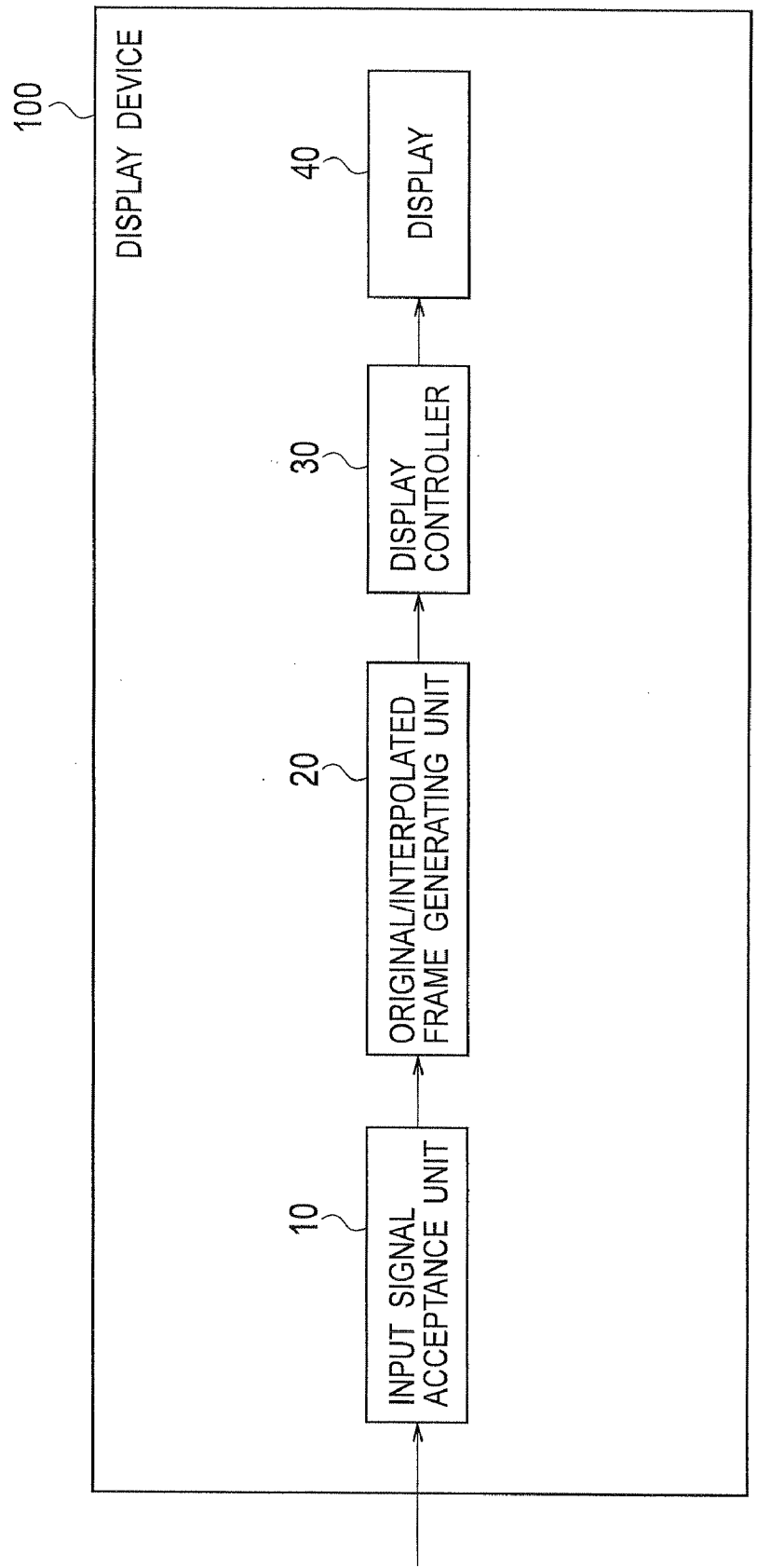
FIG. 1 is a block diagram showing a configuration of a display device 100 according to a first embodiment.

Now, a display device according to an embodiment of the present invention will be described below with reference to the accompanying drawings, In the following description of the drawings, identical or similar constituents are denoted by identical or similar reference numerals, It is to be noted, however, that the drawings are merely schematic and proportions of respective dimensions and other factors may be different from actuality. It is therefore to be understood that concrete dimensions and other factors is determined in consideration of the following description. Moreover, it is needless to say that dimensional relations or proportions may vary among the drawings.

First Embodiment

Configuration of Display Device

Now, a configuration of a display device according to a first embodiment will be described below with reference to the accompanying drawings. FIG. 1 is a block diagram showing a display device 100 according to the first embodiment.

The display device 100 converts a video image with original frame rate (a first frame rate) corresponding to a video image input signal into a video image with n-times the original frame rate (a second frame rate) by dividing one frame period into multiple divided frame periods and then displaying a video image frame for each divided frame period. The first embodiment describes an example in which the display device 100 converts the original frame rate of the video image into four times the original frame rate.

As shown in FIG. 1, the display device 100 includes an input signal acceptance unit 10, an original/interpolated frame generating unit 20, a display controller 30, and a display 40.

The input signal acceptance unit 10 acquires video image input signals (red input signals R, green input signals G, and blue input signals B) from a DVD player, a TV tuner, and the like.

The original/interpolated frame generating unit 20 generates video image output signals Wed output signals R, green output signals G, and blue output signals B) for each pixel forming a frame, based on the video image input signals (the red input signals R, the green input signals G, and the blue input signals B) for each pixel forming the frame. Here, the original/interpolated frame generating unit 20 generates original frames and interpolated frames based on the video image input signals. That is, the original/interpolated frames generating unit 20 generates the vide image output signals corresponding to the original frames and the interpolated frames based on the video image input signals. The origin interpolated frame generating unit 20 outputs the vide image output signals corresponding to the original frames and the interpolated frames to the display controller 30. Details of the original/interpolated frame generating unit 20 will be described later.

The display controller 30 displays video image frames on the display 40 in response to the video image output signals. As described above, the display controller 30 displays the video image frame for each divided frame period by use of the original frame and the interpolated frames.

Figure 2:
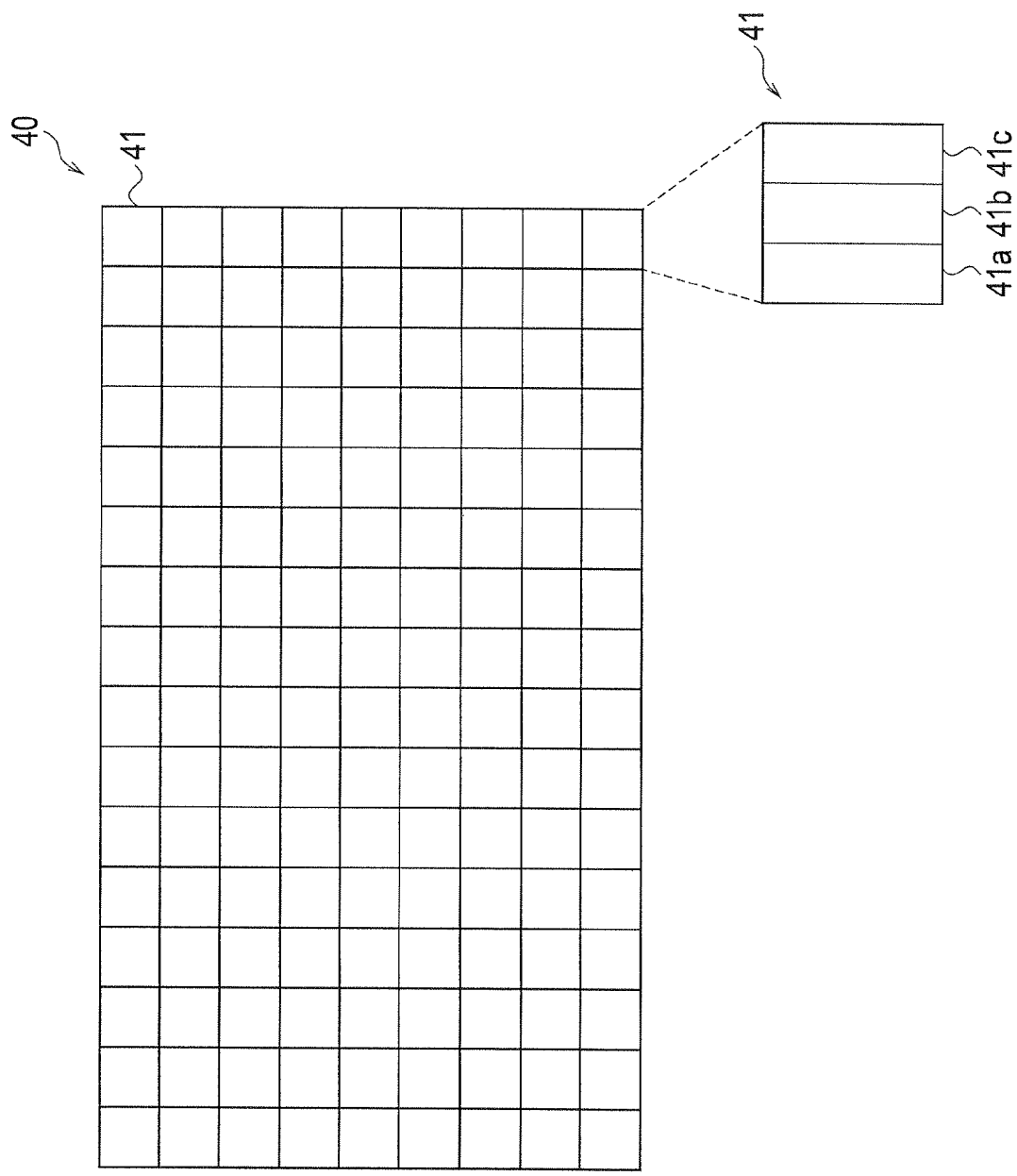
FIG. 2 is a view showing a configuration of a display 40 according to the first embodiment.

The display 40 includes a plurality of pixels 41 as shown in FIG. 2. Each pixel 41 includes a plurality of sub-pixels (a sub-pixel 41a, a sub-pixel 41b, and a sub-pixel 41c). In the first embodiment, the sub-pixel 41a is the sub-pixel corresponding to red, the sub-pixel 41b is the sub-pixel corresponding to green and the sub-pixel 41c is the sub-pixel corresponding to blue.

The layout of the plurality of sub-pixels included in the pixel 41 is arbitrarily determined. In the first embodiment, the plurality of sub-pixels included in the pixels 41 are regularly arranged in a horizontal direction.

Configuration of Original/Interpolated Frame Generating Unit

Figure 3:
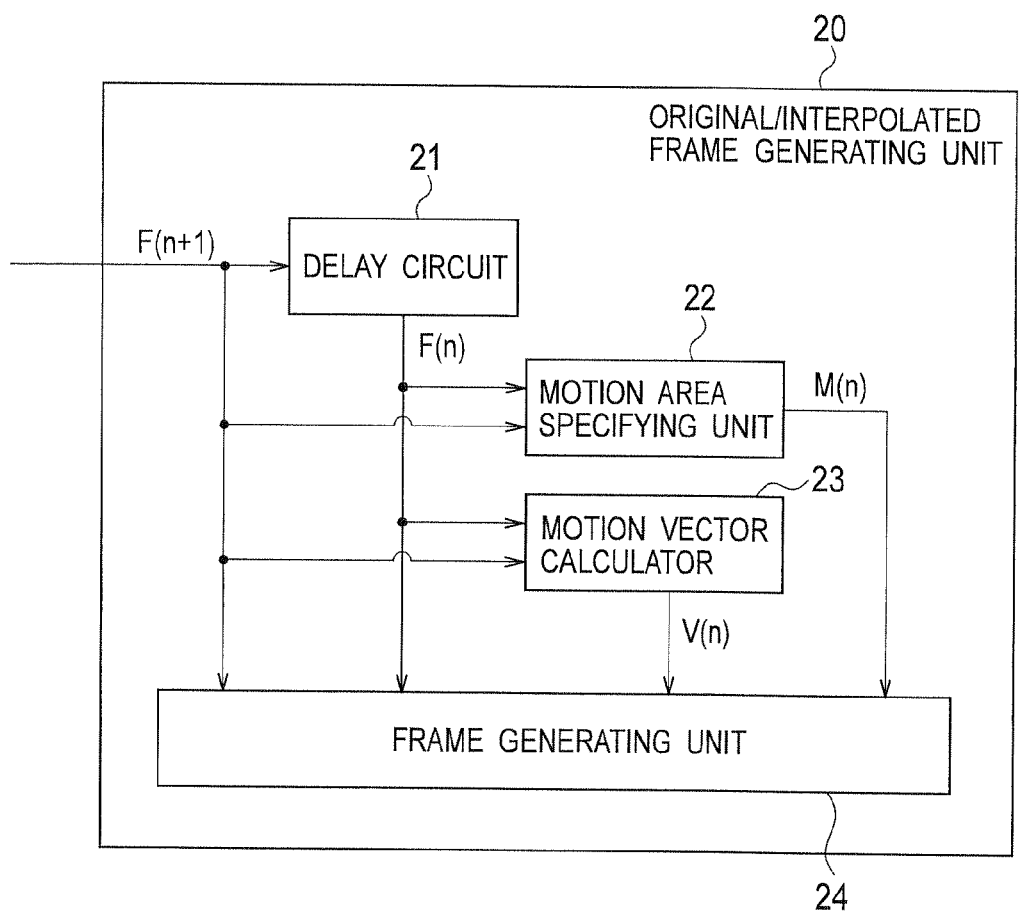
FIG. 3 is a block diagram showing a configuration of an original/interpolated frame generating unit 20 according to the first embodiment.

Now, a configuration of the original/interpolated frame generating unit according to the first embodiment will be described with reference to the accompanying drawings. FIG. 3 is a block diagram showing the configuration of the original/interpolated frame generating unit 20 according to the first embodiment.

As shown in FIG. 3, the original/interpolated frame generating unit 20 includes a delay circuit 21, a motion area specifying unit 22, a motion vector calculator 23, and a frame generating unit 24.

In FIG. 3, generation of the interpolated frames to be inserted between an n-th original frame and an n+1-th original frame will be mainly described. Specifically, FIG. 3 describes a case where a video image input signal (F(n+1)) that corresponds to the n+1-th original frame is inputted. In the first embodiment, the n-th original frame and the n+1-th original frame are reference original frames to be used for reference upon generation of the interpolated frames.

The delay circuit 21 is the circuit for delaying the video image input signals corresponding to the original frames. To be more specific, the delay circuit 21 delays and outputs the video image input signal (F(n)) corresponding to the n-th original frame.

The motion area specifying unit 22 specifies a motion area M(n)) that contains a target image that moves between the n-th original frame and the n+1-th original frame based on the video image input signal (F(n)) and the video image input signal (F(n+1)).

The motion vector calculator 23 calculates a motion vector (V(n)) of the target image that moves between the n-th original frame and the n+1-th original frame based on the video image input signal (F(n)) and the video image input signal (F(n+1)). Here, as the method of calculating the motion vector (V(n)), it is possible to apply known methods such as a method of performing dot matching or block matching for each block contained in the frame.

The frame generating unit 24 generates the original frames and the interpolated frames. When generating the original frames, the frame generating unit 24 generates the n-th original frame based on the video image input signal (F(n)). Similarly, the frame generating unit 24 generates the n+1-th original frame based on the video image input signal (F(n+1)).

Meanwhile, the interpolated frames are generated as follows. Concerning the motion area (M(n)) specified by the motion area specifying unit 22, the frame generating unit 24 generates part of the interpolated frame corresponding to the motion area (M(n)) in accordance with the motion vector (V(n)) calculated by the motion vector calculator 23. Meanwhile, concerning the area (i.e. a static area) other than the motion area (M(n)) specified by the motion area specifying unit 22, the frame generating unit 24 generates the remaining part of the interpolated frame corresponding to the static area in accordance with either the video image input signal (F(n)) or the video image input signal F(n+1)).

Now, consideration will be made of the case where the n-th original frame is a frame shown in FIG. 4A while the n+1-th original frame is a frame shown in FIG. 4B, for example.

As shown in FIG. 4C, the motion vector calculator 23 calculates the motion vector (V(n)) based on the n-th original flame and the n+1-th original frame.

As shown in FIG. 4D, the motion area specifying unit 22 specifies the motion area M(n)) based on the n-th original frame and the n+1-th original frame.

As shown in FIG. 4E, the frame generating unit 24 generates the interpolated frame for compensating the motion of the target image contained in the original frame.

Figure 5:
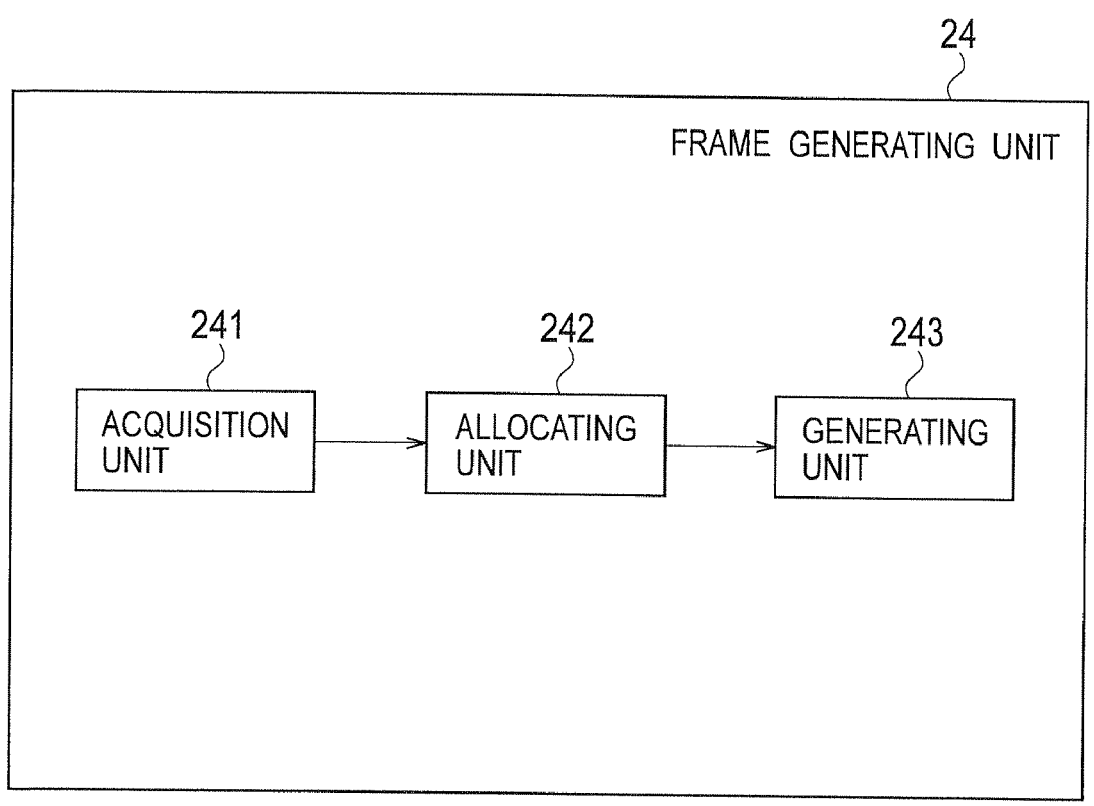
FIG. 5 is a block diagram showing a configuration of a frame generating unit 24 according to the first embodiment.

Now, generation of the interpolated frame will be described further in detail In particular, generation of the part of the interpolated frame corresponding to the motion area M(n)) will be described herein. As shown in FIG. 5, the frame generating unit 24 includes an acquisition unit 241, an allocating unit 242, and a generating unit 243.

The acquisition unit 241 acquires the numbers of sub-pixels corresponding to an amount of motion of the target image between the reference original frames (the n-th original frame and the n+1-th original frame in the first embodiment) to be used for reference upon generation of the interpolated frames. Specifically, the acquisition unit 241 converts the amount of motion of the target image into the numbers of sub-pixels in accordance with a length of the motion vector (V(n)) calculated by the motion vector calculator 23.

Here, the target image includes a single pixel 41, a group of pixels 41, a single sub-pixel or a group of sub-pixels included in the motion area (M(n)), The allocating unit 242 allocates the numbers of sub-pixels acquired by the acquisition unit 241 to each of the interpolated frames, in accordance with the order of the interpolated frames to be interposed between the plurality of reference original frames.

Here, in the first embodiment, the original frame rate of the video image is converted into four-times the original frame rate. Therefore, three interpolated frames are inserted between the plurality of reference original frames. Here, the three interpolated frames will be referred to as a first interpolated frame, a second interpolated frame, and a third interpolated frame, respectively, in the order closer to the n-th original frame.

Now, when the number of sub-pixels acquired by the acquisition unit 241 is defined as "A" and the conversion rate of the original frame rate is defined as "X", the number of sub-pixels "Bn" to be allocated to the n-th interpolated frame will be expressed as $Bn=(A \times n)/X$.

If the number of sub-pixels Bn is not an integer, the number of sub-pixels Bn is adjusted to an integer by methods such as rounding up, rounding down, or rounding off to the nearest whole number. The number of sub-pixels Bn represents a shift amount of the target image between the n-th original frame and the n-th interpolated frame.

The generating unit 243 generates the interpolated frames to be interposed between the plurality of reference original frames in accordance with the numbers of sub-pixels (the shift amount) allocated by the allocating unit 242.

Allocation of Sub-Pixels

Now, an example of allocation of the sub-pixels according to the first embodiment will be described with reference to FIG. 6 and FIG. 7.

As shown in FIG. 6. consideration will be made for the case where the number of sub-pixels corresponding to the amount of motion of the target image between the n-th original frame and the n+1-th original frame is equal to "6".

In this case, as shown in FIG. 7, the number of sub-pixels to be allocated to the first interpolated frame is calculated as "$B1=6 \times \frac{1}{4}=1.5$", which will be adjusted to "1", for example. The number of sub-pixels to be allocated to the second interpolated frame is calculated as "$B1=6 \times \frac{2}{4}=3$". The number of sub-pixels to be allocated to the third interpolated frame is calculated as "$B3=6 \times \frac{3}{4}=4.5$", which will be adjusted to "4", for example.

Operations of Display Device

Now, operations of the display device according to the first embodiment will be described with reference to the accompanying drawing. FIG. 8 is a flowchart showing the operations of the display device 100 according to the first embodiment. FIG. 8 describes generation of the interpolated frames. In particular, generation of the part of the interpolated frames corresponding to the motion area (M(n)) will be described herein.

As shown in FIG. 8, in Step 10, the display device 100 specifies the motion area that contains the target image moving between the plurality of reference original frames, based on the video image input signals corresponding to the plurality of reference original frames.

In Step 11, the display device 100 calculates the motion vector of the target image moving between the plurality of reference original frames, based on the video image input signals corresponding to the plurality of reference original frames.

In Step 12, the display device 100 acquires the numbers of sub-pixels corresponding to the amount of motion of the target image between the plurality of reference original frames, in accordance with the motion vector calculated in Step 11.

In Step 13, the display device 100 allocates the number of sub-pixels acquired in Step 12 to each of the interpolated frames, in accordance with the order of the interpolated frames to be interposed between the plurality of reference original frames.

In Step 14, the display device 100 generates the interpolated frames to be interposed between the plurality of reference original frames in accordance with the numbers of sub-pixels (the shift amount of the target image) allocated in Step 13.

Effect

According to the first embodiment, the allocating unit 242 allocates the numbers of sub-pixels acquired by the acquisition unit 241 to each of the interpolated frames, in accordance with the order of the interpolated frames to be interposed between the plurality of reference original frames. The generating unit 243 generates the interpolated frames in accordance with the numbers of sub-pixels allocated by the allocating unit 242. That is to say, the interpolated frames are generated on the sub-pixel basis which is finer than the pixel basis, thereby suppressing non-smoothness of a video image to be displayed at n-times the original frame rate.

Second Embodiment

Now, a second embodiment will be described below with reference to the accompanying drawings. Here, the differences between the above-described first embodiment and the second embodiment will be mainly described below.

Specifically, the numbers of sub-pixels (the shift amount of the target image) to be allocated to each of the interpolated frames to be interposed between the plurality of reference original frames has been described in the fist embodiment.

Meanwhile, the second embodiment describes a case of concerning the number of sub-pixels (the shift amount of the target image) to be allocated to each of the intermediate original frame, when an original frame (hereinafter referred to as an intermediate original frame) is interposed between the reference original frames.

The second embodiment describes a case in which the n-th original frame and an n+2-th original frame are the reference original frames, while the n+1-th original frame is the intermediate original frame.

Moreover, the second embodiment describes the case where the original frame rate of the video image is converted into four-times the frame rate of the original frame rate, as similar to the fist embodiment. Therefore, six interpolated frames and one original frame are interposed between the plurality of reference original frames. Here, the six interpolated frames will be referred to as the first interpolated frame, the second interpolated frame, the third interpolated frame, a fifth interpolated frame, a sixth interpolated frame, and a seventh interpolated frame, respectively, in the order closer to the n-th original frame. The intermediate original frame (the n+1-th original frame) interposed between the plurality of reference original frames is located in the fourth position.

Configuration of Frame Generating Unit

Now, the configuration of the frame generating unit according to the second embodiment will be described with reference to the accompanying drawing. FIG. 9 is a block diagram showing the configuration of the frame generating unit 24 according to the second embodiment. It is to be noted that the constituents similar to those in FIG. 5 described above are denoted by similar reference numerals in FIG. 9.

As shown in FIG. 9, the frame generating unit 24 includes a determination unit 244 in addition to the configuration illustrated in FIG. 5.

The above-described allocating unit 242 allocates the number of sub-pixels acquired by the acquisition unit 241 to the intermediate original frame (the n+1-th original frame in the second embodiment) in accordance with the order of the intermediate original frame interposed between the plurality of reference original frames (the n-th original frame and the n+2-th original frame in the second embodiment). Here, when the order of the intermediate original frame is defined as n-th, the number of sub-pixels "Bn" to be allocated to the intermediate original frame is expressed as $Bn=(A\times n)/(X\times p)$. Here, the code p is defined as (the number of the intermediate original frames interposed between the plurality of reference original frames)+1.

The above-described generating unit 243 generates corrected original frames corresponding to the intermediate original frames in accordance with the number of sub-pixels (the shift amount) allocated to the intermediate original frames by the allocating unit 242.

The above-described acquisition unit 241 acquires a gap amount of the target image between the intermediate original frame and the corrected original frame. The gap amount of the target image is preferably a value expressed by using the number of sub-pixels. However, the present invention is not limited only to this configuration. The gap amount of the target image may also be a value expressed by use of the number of pixels, for example.

The determination unit 244 determines whether to use the intermediate original frames or the corrected original frames. Specifically, the determination unit 244 determines to use the corrected original frames when the gap amount acquired by the acquisition unit 241 is smaller than a predetermined threshold, because the target image is presumably moving at substantially constant speed. On the other hand, the determination unit 244 determines to use the intermediate original frames when the gap amount acquired by the acquisition unit 241 is larger than the predetermined threshold, because the target image is presumably moving at noticeably accelerated speed.

Allocation of Sub-Pixels

Now, an example of allocation of the sub-pixels according to the second embodiment will be described with reference to FIG. 10 to FIG. 12 below.

As shown in FIG. 10, consideration will be made for the case where the number of sub-pixels corresponding to the amount of motion of the target image between the n-th original frame and the n+1-th original frame is equal to "3," while the number of sub-pixels corresponding to the amount of motion of the target image between the n+1-th original frame and the n+2-th original frame is equal to "6". That is, the case where the number of sub-pixels corresponding to the amount of motion of the target image between the n-th original frame and the n+2-th original frame is equal to "9" will be considered herein.

First, the case of not correcting the intermediate original frame, i.e. the case of using the intermediate original frame as it is, will be described, which is similar to the fist embodiment.

In this case, the n-th original frame and the n+1-th original frame are used as the reference original frames for the interpolated frames to be interposed between the n-th original frame and the n+1-th original frame. The n+1-th original frame and the n+2-th original frame are used as the reference original frames for the interpolated frames to be interposed between the n+1-th original frame and the n+2-th original frame.

Figure 11:
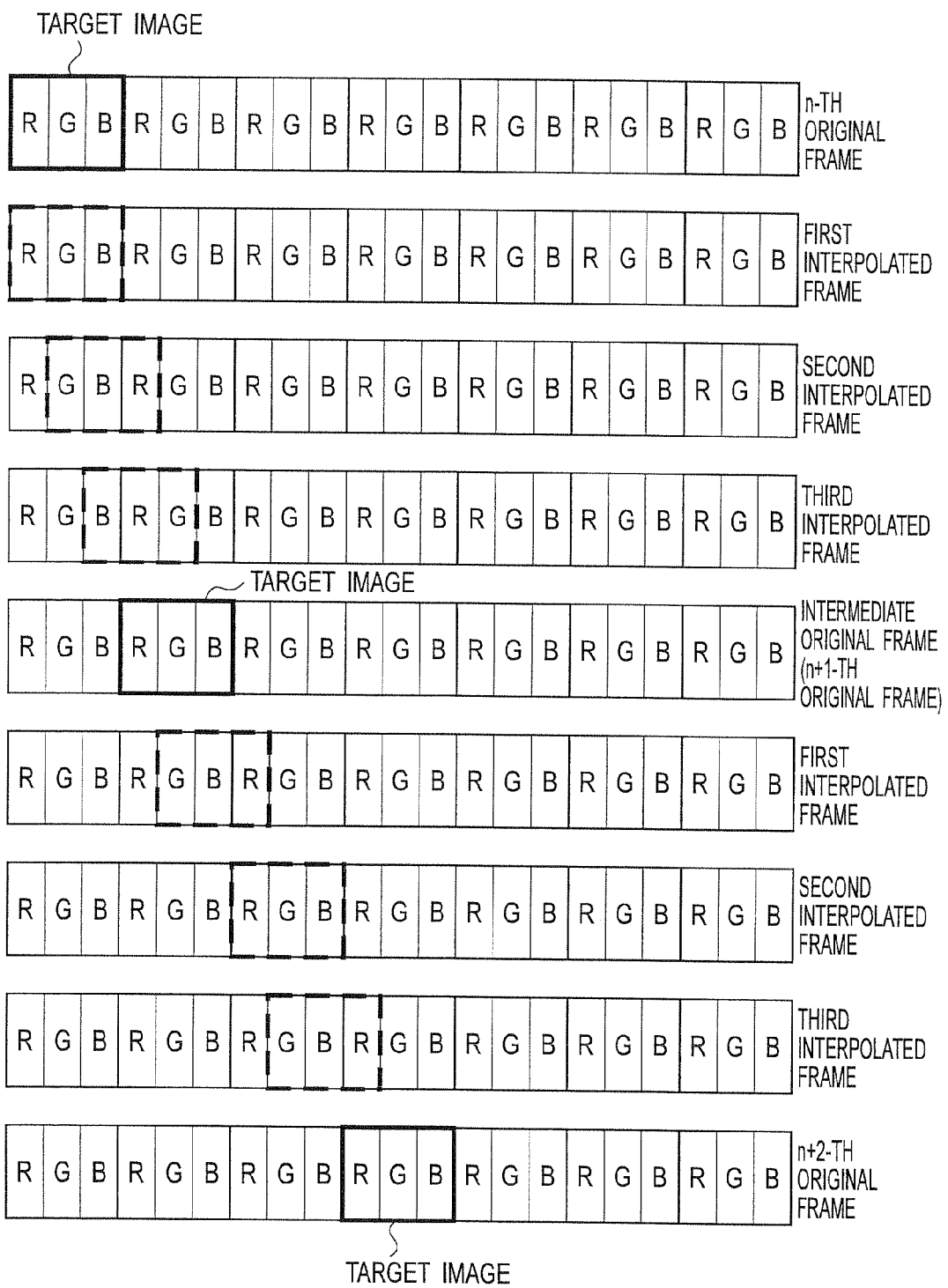
FIG. 11 is a view for explaining allocation of the numbers of sub-pixels according to the second embodiment.

As shown in FIG. 11, the number of the sub-pixels to be allocated to each of the interpolated frames to be interposed between the plurality of reference original frames (the n-th original frame and the n+1-th original frame), i.e. the shift amount of the target image from the n-th original frame to the n-th interpolated frame, is as follows, The number of sub-pixels to be allocated to the first interpolated frame is calculated as "$B1=3\times\frac{1}{4}=0.75$", which is adjusted to "0", for example. The number of sub-pixels to be allocated to the second interpolated frame is calculated as "$B2=3\times\frac{2}{4}=1.5$", which is adjusted to "1", for example. The number of sub-pixels to be allocated to the third interpolated frame is calculated as "$B3=3\times\frac{3}{4}=2.25$", which is adjusted to "2", for example.

Meanwhile, the number of the sub-pixels to be allocated to each of the interpolated frames to be interposed between the plurality of reference original frames (the n+1-th original frame and the n+2-th original frame), i.e. the shift amount of the target image from the n+1-th original frame to the n-th interpolated frame, is as follows. The number of sub-pixels to be allocated to the first interpolated frame is calculated as "$B1=6\times\frac{1}{4}=1.5$", which is adjusted to "1", for example. The number of sub-pixels to be allocated to the second interpolated frame is calculated as "$B2=6\times\frac{2}{4}=3$". The number of sub-pixels to be allocated to the third interpolated frame is calculated as "$B3=6\times\frac{3}{4}=4.5$", which is adjusted to "4", for example.

Second, the case of correcting the intermediate original frame, i.e. the case of using the corrected original frame will be described. In this case, the n-th original frame and the n+2-th original frame axe used as the reference original frames.

Figure 12:
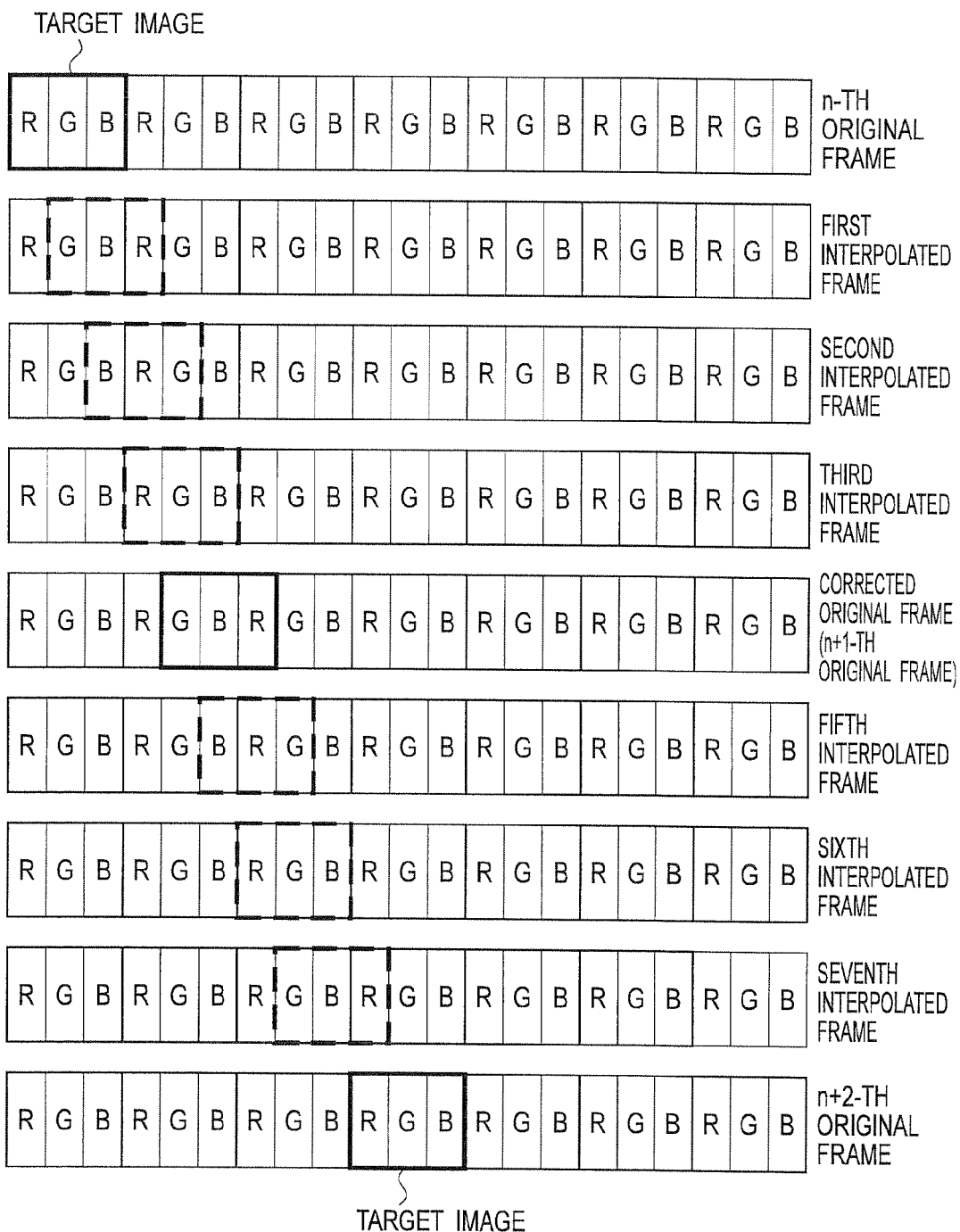
FIG. 12 is a view for explaining allocation of the numbers of sub-pixels according to the second embodiment.

As shown in FIG. 12, the number of the sub-pixels to be allocated to each of the interpolated frames to be interposed between the plurality of reference original frames (the n-th original frame and the n+2-th original frame), i.e. the shift amount of the target image from the n-th original frame to the n-th interpolated frame, is as follows. The number of sub-pixels to be allocated to the first interpolated frame is calculated as "$B1=9\times1/(4\times2)=1.125$", which is adjusted to "1", for example. The number of sub-pixels to be allocated to the second interpolated frame is calculated as "$B2=9\times2/(4\times2)=2.25$", which is adjusted to "2", for example. The number of sub-pixels to be allocated to the third interpolated frame is calculated as "$B3=9\times3/(4\times2)=3.375$", which is adjusted to "3", for example. The number of sub-pixels to be allocated to the fifth interpolated frame is calculated as "$B5=9\times5/(4\times2)=5.625$", which is adjusted to "5", for example. The number of sub-pixels to be allocated to the sixth interpolated frame is calculated as "$B6=9\times6/(4\times2)=6.75$", which is adjusted to "6", for example. The number of sub-pixels to be allocated to the seventh interpolated frame is calculated as "$B7=9\times7/(4\times2)=7.875$", which is adjusted to "7", for example.

Here, the number of the sub-pixels to be allocated to the intermediate original frame (the corrected original frame), i.e. the shift amount of the target image from the n-th original frame to the n-th corrected original frame, is as follows. Since the corrected original frame is located in the fourth position, the number of sub-pixels to be allocated to the corrected original frame is calculated as "$B4=9\times4/(4\times2)=4.5$", which is adjusted to "4", for example.

Therefore, the gap amount of the target image between the intermediate original frame and the corrected original frame is equal to "1 sub-pixel".

When the gap amount of "1 sub-pixel" is larger than the predetermined threshold, the determination unit 244 determines to generate the interpolated frames in accordance with the method of the first embodiment, and to use the intermediate original frame (see FIG. 11). On the contrary, when the gap amount of "1 sub-pixel" is smaller than the predetermined threshold, the determination unit 244 determines to generate the interpolated frames in accordance with the method of the second embodiment, and to use the corrected original frame (see FIG. 12).

Operations of Display Device

Figure 13:
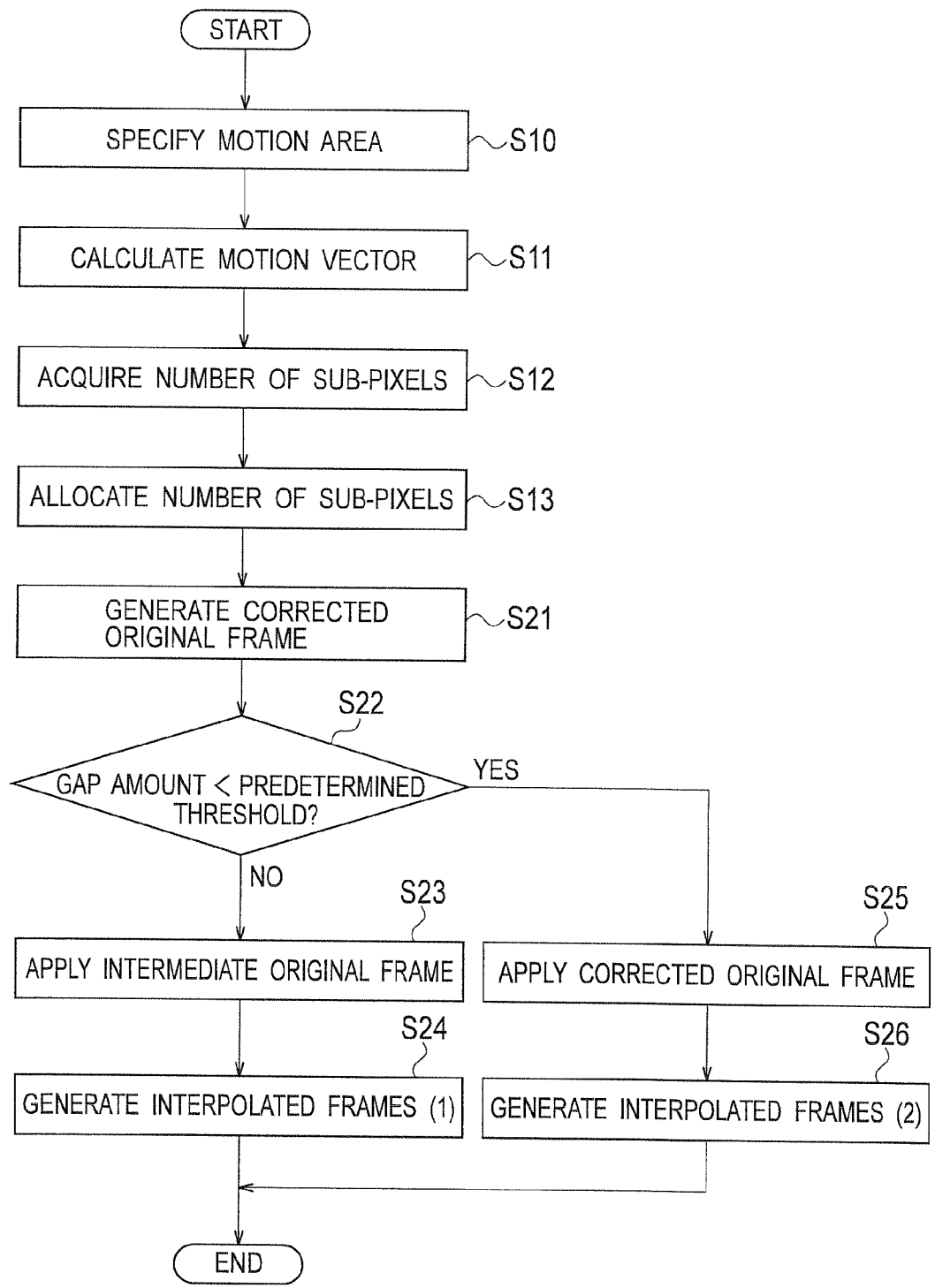
FIG. 13 is a flowchart showing operations of the display device 100 according to the second embodiment.

Now, operations of the display device according to the second embodiment will be described with reference to the accompanying drawing. FIG. 13 is a flowchart showing operations of the display device 100 according to the second embodiment. FIG. 13 describes generation of the interpolated frames. In particular, generation of part of the interpolated frames corresponding to the motion area (M(n)) will be described herein.

In FIG. 13, the procedures that are similar to those in FIG. 8 are denoted by similar step numbers. Specifically, FIG. 13 includes different procedures after Step 13 from those of FIG. 8.

As shown in FIG. 13, in Step 21, the display device 100 generates the corrected original frame corresponding to the intermediate original frame in accordance with the number of sub-pixels (the shift amount of the target image) allocated to the intermediate original frame in Step 13.

In Step 22, the display device 100 determines whether or not the gap amount of the target image between the intermediate original frame and the corrected original frame is smaller than the predetermined threshold. The display device 100 proceeds to the process in Step 23 when the gap amount of the target image is larger than the predetermined threshold. On the contrary, the display device 100 proceeds to the process in Step 25 when the gap amount of the target image is smaller than the predetermined threshold.

In Step 23, the display device 100 uses the intermediate original frame as it is. In Step 24, the display device 100 generates the interpolated frames in accordance with the method of the first embodiment (see FIG. 11).

In Step 25, the display device 100 uses the corrected original frame. In Step 26, the display device 100 generates the interpolated frames in accordance with the method of the second embodiment (see FIG. 12).

Effect

In the second embodiment, the plurality of original frames not continuous to each other are used as the reference original frames. The allocating unit 242 allocates the number of sub-pixels acquired by the acquisition unit 241 to the intermediate original frame in accordance with the order of the intermediate original frame interposed between the plurality of original frames. The generating unit 243 generates the corrected original frame in accordance with the number of sub-pixels allocated to the intermediate original frame. Specifically, by using the corrected original frame, the non-smoothness of the video image displayed at n-times the original frame rate can be suppressed.

Moreover, in the second embodiment, the determination unit 244 determines whether to use the intermediate original frame or the corrected original frame depending on the gap amount of the target image between the intermediate original frame and the corrected original frame. Specifically, the determination unit 244 determines to use the corrected original frames when the gap amount of the target image is smaller than the predetermined threshold, i.e. when the target image is presumably moving substantially at constant speed. On the contrary, the determination unit 244 determines to use the intermediate original frames when the gap amount of the target image is larger than the predetermined threshold, i.e. when the target image is presumably moving at noticeably accelerated speed.

In this way, it is possible not only to suppress non-smoothness of the video image to be displayed at n-times the original frame rate, but also to suppress significant deviation of displayed video image from the original video image.

First Modified Embodiment

Now, a first modified embodiment applicable to the first and second embodiments will be described below with reference to the drawings. Here, points different from the first and second embodiments will be mainly described below. Specifically, the first modified embodiment applies delta arrangement as arrangement of the pixels.

Here, the first modified embodiment applies the concept of using the numbers of sub-pixels corresponding to the amount of motion of the target image between the reference original frames upon generation of the interpolated frames or the corrected original frames, as in the first and second embodiments The following description will exemplify a case of applying the first embodiment to the delta arrangement. Note that the first modified embodiment shows the pixel arrangement in two dimensions spreading in a horizontal direction and a vertical direction.

Figure 14:
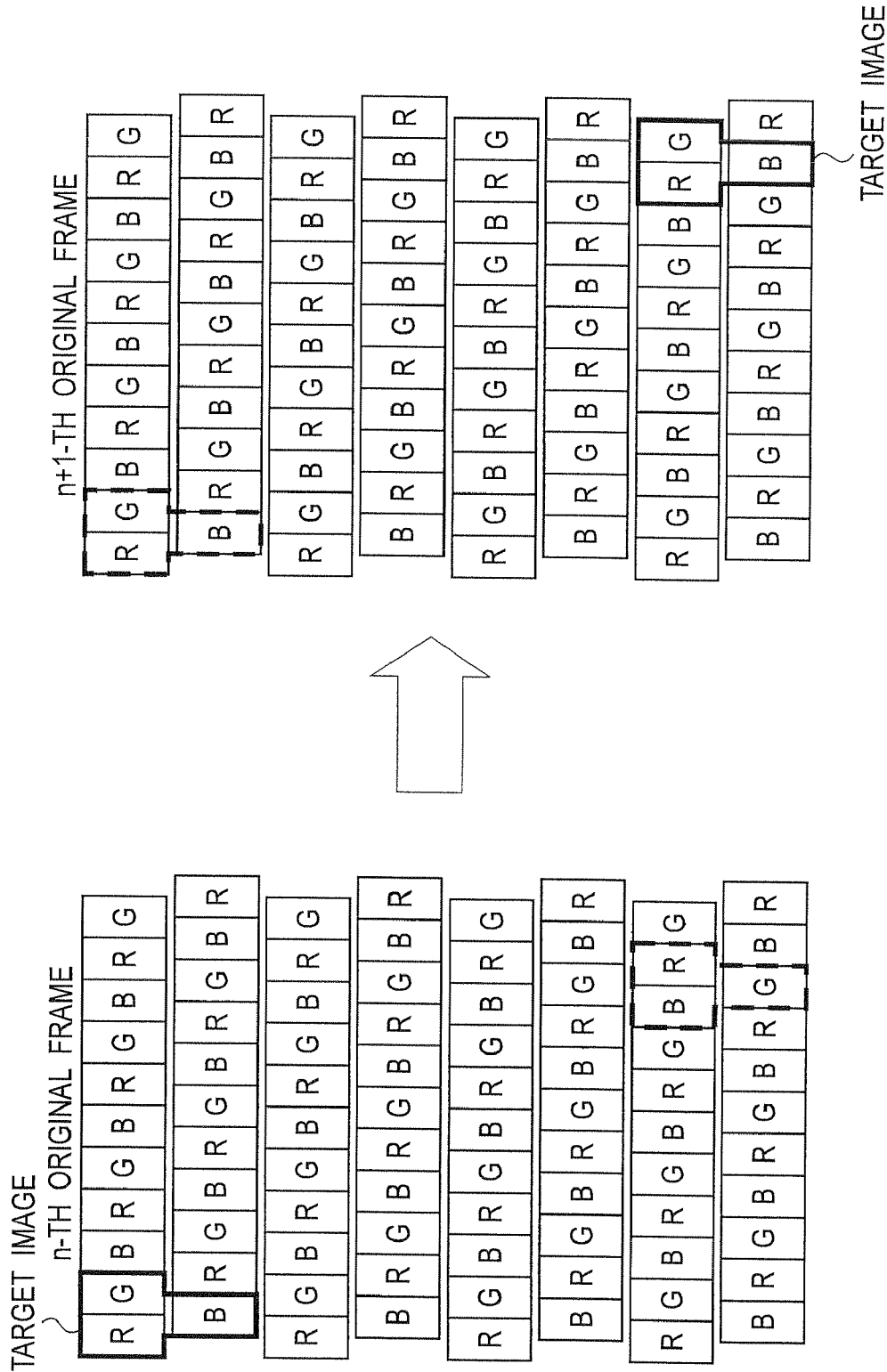
FIG. 14 is a view showing pixel arrangement according to a first modified embodiment.

Specifically, an example of generating interpolated frames between the n-th original frame and the n+1-th original frame will be described as shown in FIG. 14. Specifically, the first modified embodiment shows the example of generating five interpolated frames. In the delta arrangement, pixels in a triangular shape and pixels in an inverted triangular shape are alternately arranged in the horizontal direction. A target image is indicated with bold lines in FIG. 14.

Figure 15:
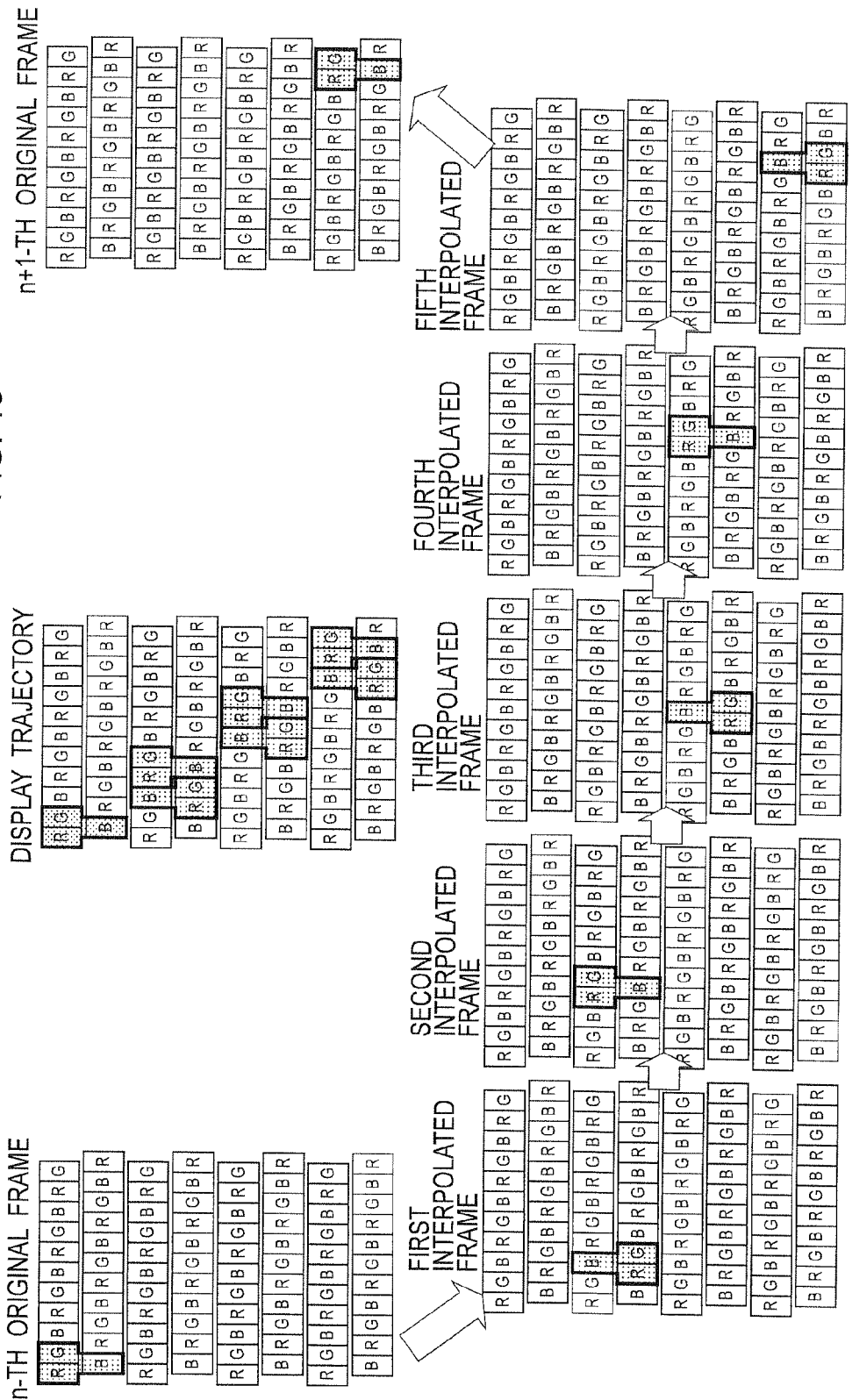
FIG. 15 is a view showing a display trajectory of a target image according to a comparative example.

First, a case of generating the interpolated frames on the pixel basis as demonstrated in the related art will be described with reference to FIG. 15. Note that the target image is indicated with bold lines in FIG. 15. First to fifth interpolated frames include the target image which is moved on the pixel basis, In this case, a non-smooth video image is generated as shown in a display trajectory of the target image in the n-th original frame, the first to fifth interpolated frames and the n+1-th original frame.

Figure 16:
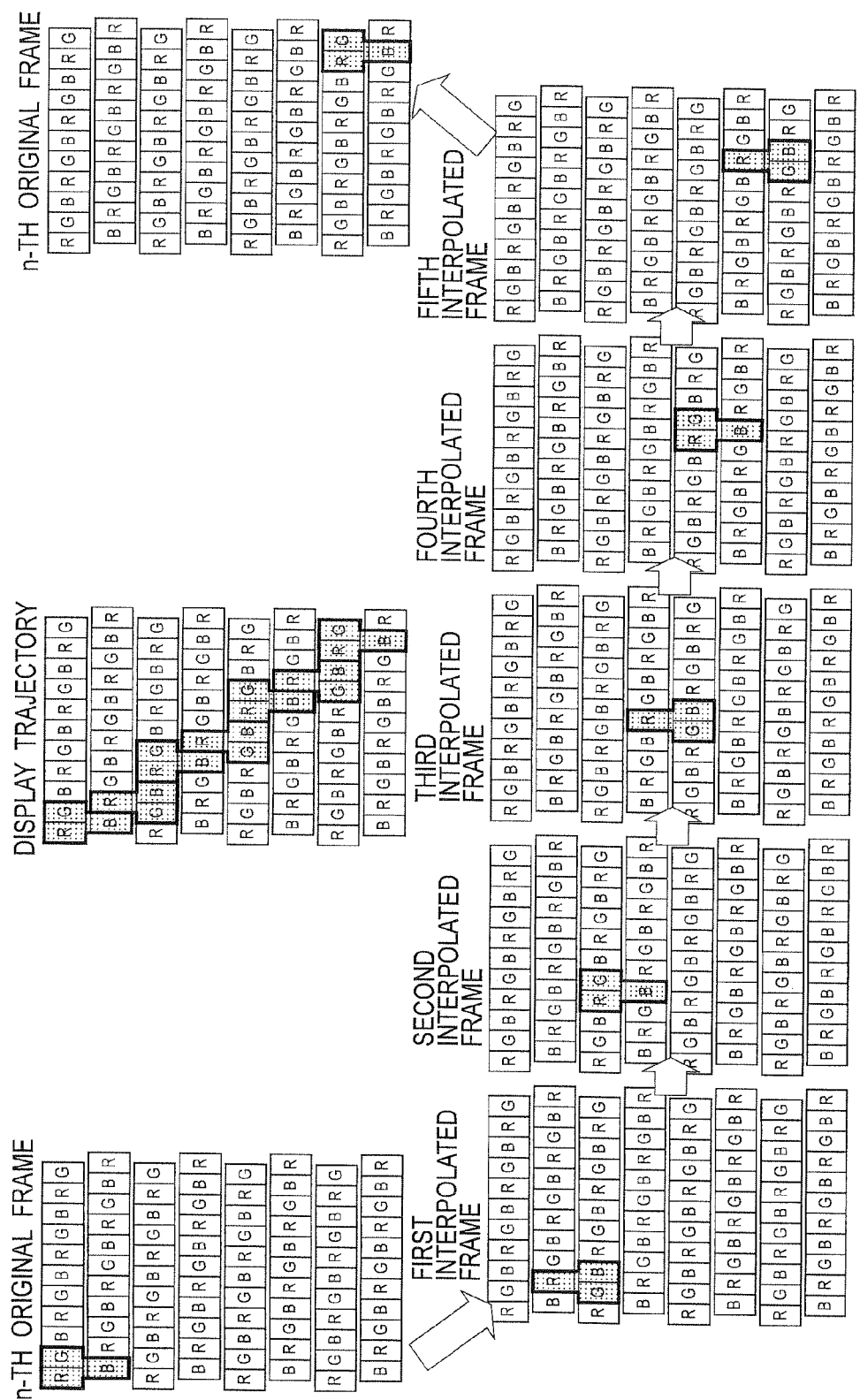
FIG. 16 is a view showing a display trajectory of a target image according to the first modified embodiment.

Second, a case of generating the interpolated frames on the sub-pixel basis as demonstrated in the first embodiment will be described with reference to FIG. 16. Note that the target image is indicated with bold lines in FIG. 16. First to fifth interpolated frames include the target image which is moved on the sub-pixel basis. In this case, the video image is smooth as shown in a display trajectory of the target image in the n-th original frame, the first to fifth interpolated frames and the n+1-th original frame.

Effect

According to the first modified embodiment, even when the delta arrangement is applied as the pixel arrangement, non-smoothness of a video image displayed at n-times the original frame rate is suppressed by generating the interpolated frames on the sub-pixel basis which is finer than the pixel basis, as in the first embodiment.

Second Modified Embodiment

Now, a second modified embodiment applicable to the first and second embodiments will be described below with reference to the drawings. Here, points different from the first and second embodiments will be mainly described below. Specifically, the second modified embodiment applies diagonal arrangement as arrangement of the pixels.

Here, the second modified embodiment applies the concept of using the numbers of sub-pixels corresponding to the amount of motion of the target image between the reference original frames upon generation of the interpolated frames or the corrected original frames, as in the first and second embodiments.

The following description will exemplify a case of applying the first embodiment to the diagonal arrangement. Note that the second modified embodiment shows the pixel arrangement in two dimensions spreading in a horizontal direction and a vertical direction.

Figure 17:
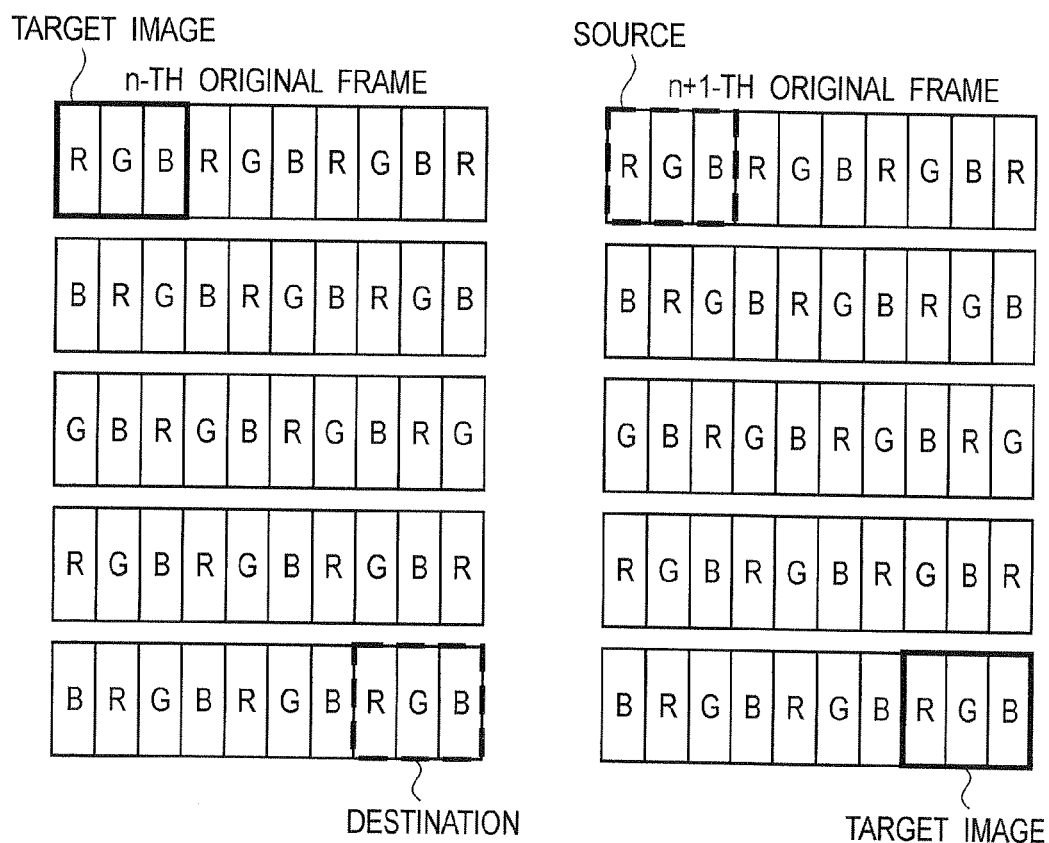
FIG. 17 is a view showing pixel arrangement according to a second modified embodiment.

Specifically, an example of generating interpolated frames between the B-th original frame and the n+1-th original frame will be described as shown in FIG. 17. Specifically, the second modified embodiment shows the example of generating three interpolated frames. In the diagonal arrangement, the sub-pixels corresponding to red, green, and blue are sequentially arranged not only in the horizontal direction but also in the vertical direction. A target image is indicated with bold lines in FIG. 17.

Figure 18:
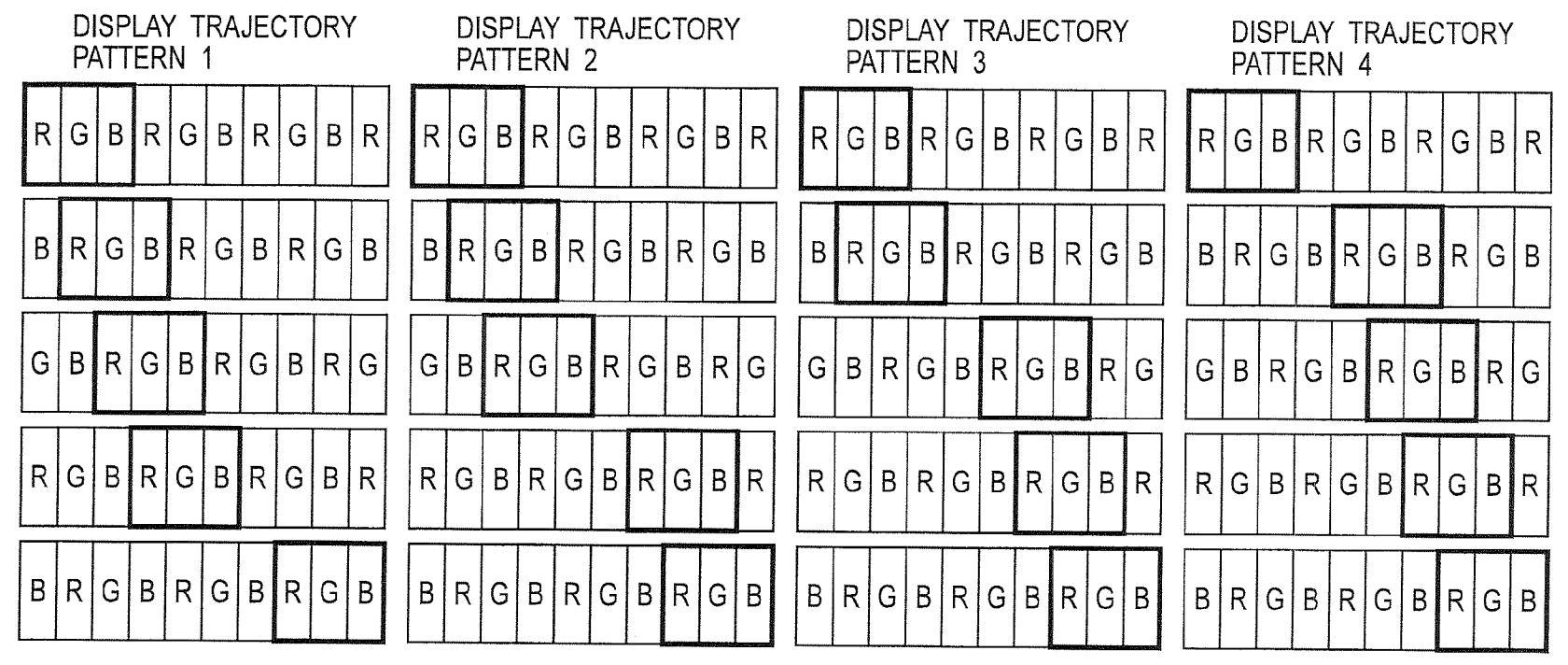

First, a case of generating the interpolated frames on the pixel basis as demonstrated in the related art will be described with reference to FIG. 18. Note that the target image is indicated with bold lines in FIG. 18. First to third interpolated frames include the target image which is moved on the pixel basis. In this case, there are four patterns of pattern 1 to pattern 4 conceivable as a display trajectory of the target image in the n-th original frame, the first to third interpolated frames and the n+1-th original frame. All of the patterns 1 to 4 cause video images that do not flow smoothly.

Figure 19:
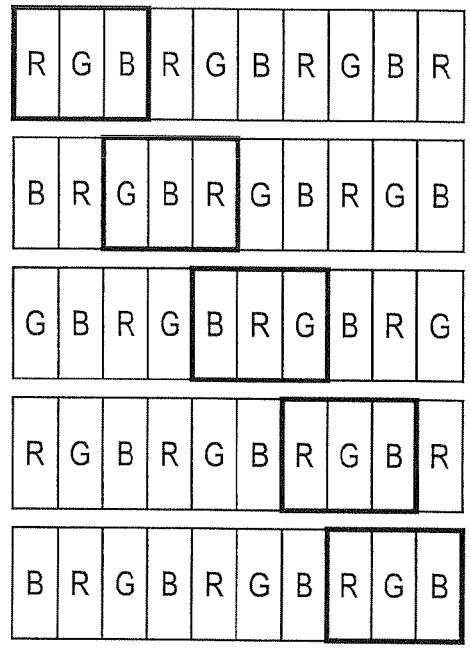
FIG. 19 is a view showing a display trajectory of a target image according to the second modified embodiment.

Second, a case of generating the interpolated frames on the sub-pixel basis as demonstrated in the first embodiment will be described with reference to FIG. 19. First to third interpolated frames include the target image which is moved on the sub-pixel basis. In this case, a video image is smooth, as shown in a display trajectory of the target image in the n-th original frame, the first to third interpolated frames, and the n+1-th original frame.

Effect

According to the second modified embodiment, even when the diagonal arrangement is applied as the pixel arrangement, non-smoothness of a video image displayed at n-times the original frame rate is suppressed by generating the interpolated frames on the sub-pixel basis which is finer than the pixel basis, as in the first embodiment.

Third Modified Embodiment

Now, a third modified embodiment applicable to the first and second embodiments will be described below with reference to the drawings Here, points different from the first and second embodiments will be mainly described below. Specifically, in the third modified embodiment, luminance of a target image is adjusted in order to suppress the discomfort attributable to the difference in the apparent width of the target image.

Here, the third modified embodiment applies the concept of using the numbers of sub-pixels corresponding to the amount of motion of the target image between the reference original frames upon generation of the interpolated frames or the corrected original frames, as in the first and second embodiments.

Figure 20:
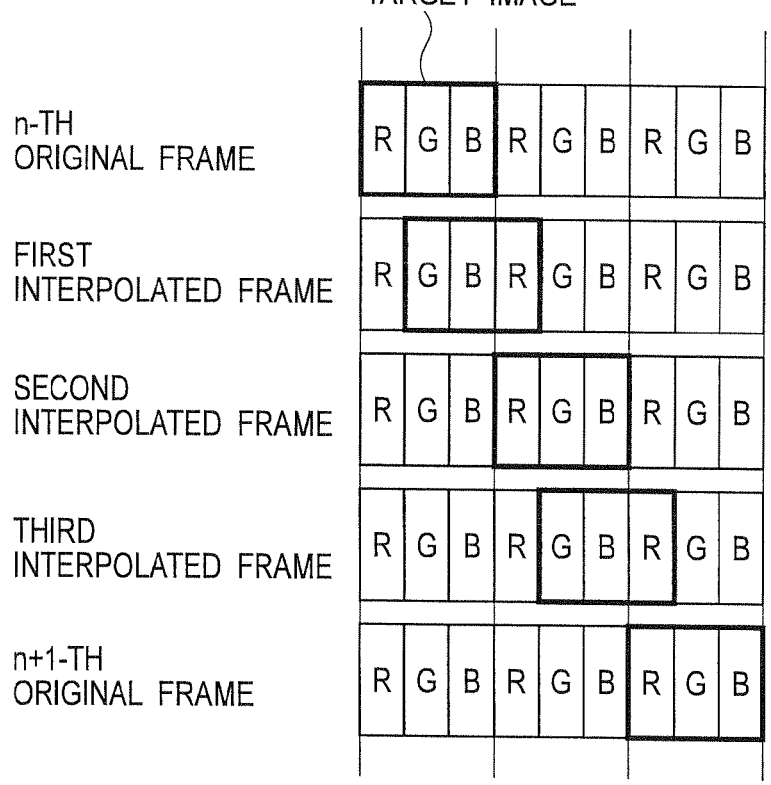
FIG. 20 is a view showing a display trajectory of a target image according to a third modified embodiment.

FIG. 20 is a view showing a display trajectory of the target image in the n-th original frame, first to third interpolated frames and the n+1-th original frame. Here, the first to third interpolated frames include the target image which is moved on the sub-pixel basis.

Now, a case where the target image is yellow will be considered herein. Specifically in the target image, the sub-pixels corresponding to red and green are turned on, while the sub-pixel corresponding to blue is turned off.

Figure 21:
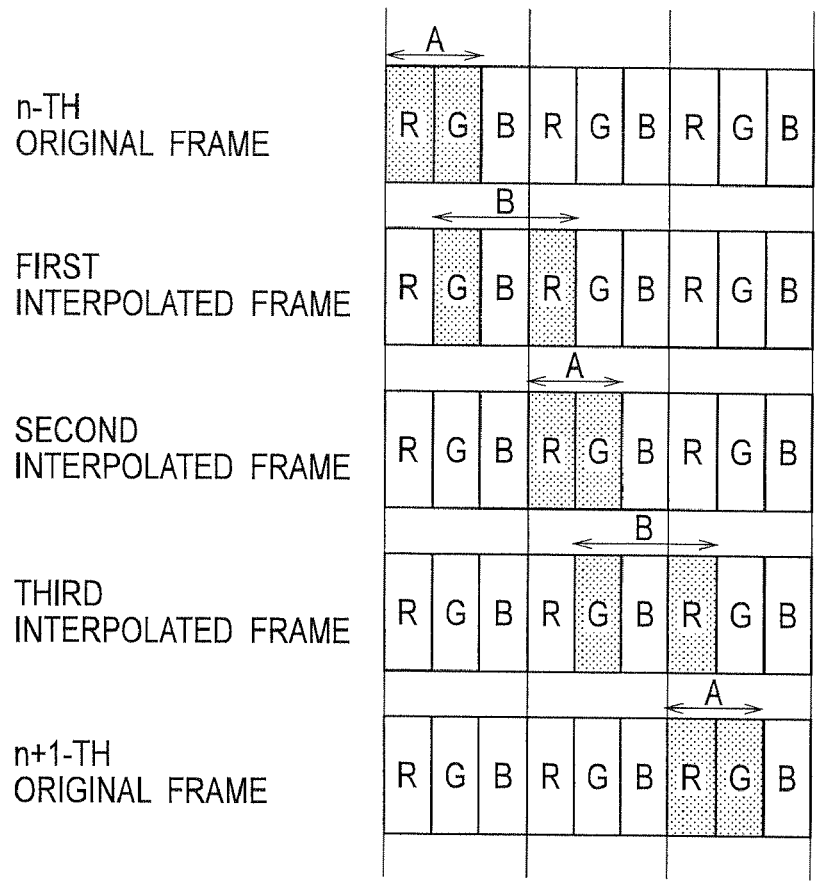
FIG. 21 is a view showing the display trajectory of the target image according to the third modified embodiment.

FIG. 21 is a view showing the trajectory of the target image shown in FIG. 20. As shown in FIG. 21, in each of the n-th original frame, the second interpolated frame and the n+1-th original frame, the target image has a width "A" because the sub-pixels corresponding to red and green axe adjacent to each other. On the other hand, in each of the first interpolated frame and the third interpolated frame, the target image has a width "B" because the sub-pixels corresponding to red and green are not adjacent to each other.

In the third modified embodiment, the luminance of the target image is adjusted by use of a luminance coefficient, in order to suppress the discomfort attributable to the difference in the apparent width of the target image.

Figure 22:
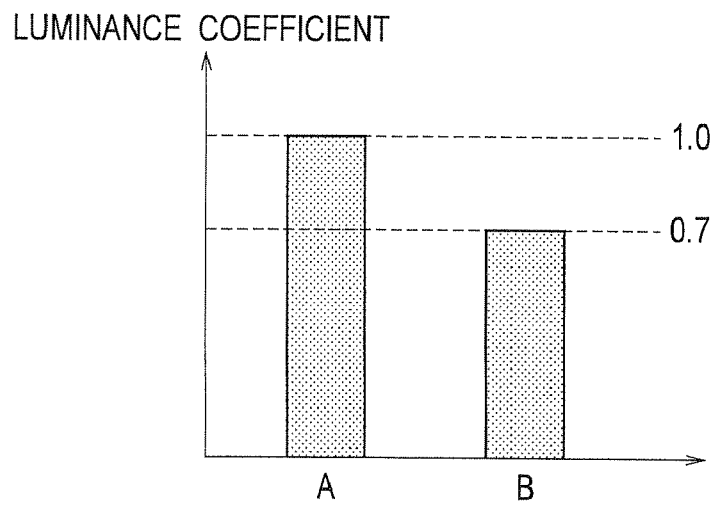
FIG. 22 is a graph showing luminance coefficients according to the third modified embodiment.

Specifically, as shown in FIG. 22, the luminance of the target image having the larger width "B" is set lower than the luminance of the target image having the smaller width "A". In this way, the discomfort attributable to the difference in the width of the target image is suppressed.

For example, a luminance coefficient "1.0" is applied to the target image having the width "A", namely, the target image included in each of the n-th original frame, the second interpolated frame, and the n+1-th original frame. Here, the luminance coefficient is the value to be multiplied by the video image output signal. Therefore, the original video output image signal without change is applied for the target image having the width "A".

On the other hand, a luminance coefficient "0.7" is applied to the target image having the width "B", namely, the target image included in each of the first interpolated frame and the third interpolated frame. As described above, the luminance coefficient is the value to be multiplied by the video image output signal. Therefore, the video output image signal multiplied by "0.7" is applied for the target image having the width "B".

Effect

According to the third modified embodiment, even if there is the difference in the apparent width of the target image when generating the interpolated frames on the sub-pixel basis, the discomfort attributable to the difference in the apparent width of the target image can be suppressed by adjusting the luminance of the target image.

Fourth Modified Embodiment

Now, a fourth modified embodiment applicable to the first and second embodiments will be described below with reference to the drawings. Here, the differences from the first and second embodiments will be mainly described below. Specifically, in the fourth modified embodiment, luminance of a target image is adjusted in order to suppress the discomfort attributable to the difference in the apparent width of the target image.

Here, the fourth modified embodiment applies the concept of using the numbers of sub-pixels corresponding to the amount of motion of the target image between the reference original frames upon generation of the interpolated frames or the corrected original frames, as in the first and second embodiments.

Figure 23:
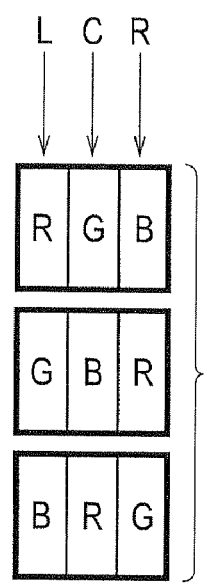
FIG. 23 is a view showing positions of sub-pixels according to a fourth modified embodiment.

FIG. 23 is a view showing three types of pixels in the diagonal arrangement. As shown in FIG. 23, in the pixels, luminance of a sub-pixel on the left side will be defined as luminance "L", luminance of a sub-pixel in the center will be defined as luminance "C", and luminance of a sub-pixel on the right side will be defined as luminance "R".

In the fourth modified embodiment, the luminance of the target image is adjusted by use of the luminance coefficient, in order to suppress the discomfort attributable to the difference in the apparent width of the target image. That is, the video image output signals of the pixel corresponding to the target image are adjusted by use of the luminance coefficient.

Figure 24:
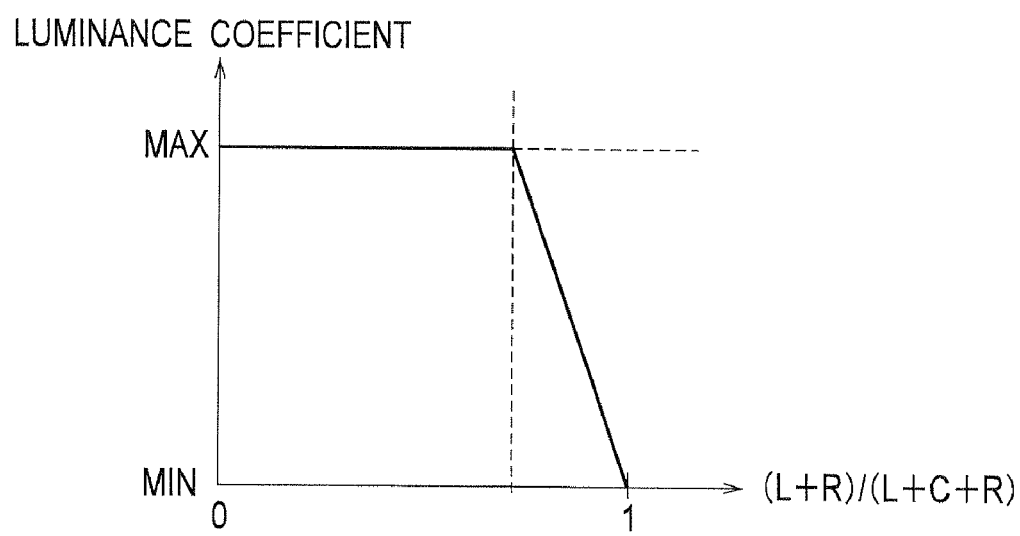
FIG. 24 is a graph showing a luminance coeffcient according to the fourth modified embodiment.

Specifically, the luminance coefficient is determined on the basis of a value obtained from "(L+R)/(L+C+R)". Here, the luminance coefficient ranges from the B um value M (>0) to the maximum value MAX (=1). As shown in FIG. 24, the luminance coefficient becomes smaller as the value "(L+R)/(L+C+R)" becomes larger, provided that the value "(L+R)/(L+C+R)" is greater than a threshold Th. That is, the video image output signal is adjusted by use of the luminance coefficient so as to reduce the luminance of the target image having the larger apparent width.

As described in the first embodiment, the original/interpolated frame generating unit 20 generates the video image output signals for each pixel forming a frame, based on the video image input signals. The original/interpolated frame generating unit 20 generates the vide image output signals corresponding to the original frames and the interpolated frames based on the video image input signals.

In fourth modified embodiment, the original/interpolated frame generating unit 20 adjusts the video image output signals of the pixels corresponding to the target image included in the interpolated Same, based on the luminance of the pixels corresponding to the target image included in the interpolated frame.

Specifically, first, the original/interpolated frame generating unit 20 calculates the luminance of the pixels corresponding to the target image included in the interpolated frame, based on the video image input signals of the pixels corresponding to the target image. Second, the original/interpolated frame generating unit 20 calculates the luminance coefficient of the pixels corresponding to the target image, based on the luminance of the pixels corresponding to the target image. Third, the original/interpolated frame generating unit 20 multiplies the video image input signals of the pixels corresponding to the target image by the luminance coefficient, and adjusts the video image output signals of the pixels corresponding to the target image.

Moreover, in the fourth modified embodiment, the diagonal arrangement is explained, but the pixel arrangement is not limited to the diagonal arrangement. The pixel arrangement may be a striped arrangement shown in the first and second embodiments.

Effect

According to the fourth modified embodiment, even if there is the difference in the apparent width of the target image when generating the interpolated frames on the sub-pixel basis, the discomfort attributable to the difference in the apparent width of the target image can be suppressed by adjusting the luminance of the target image.

Other Embodiments

Although the present invention has been described with reference to above-described embodiments, it is to be understood that the description and drawings constituting part of this disclosure does not limit the scope of the present invention. It is obvious to those skilled in the art that various alternative embodiments, examples, and technical applications are possible from the teachings of this disclosure.

For example, in the above-described second embodiment, the intermediate original frame interposed between the reference original frames consists of the single original frame. However, the second embodiment is not limited only to this configuration. The plurality of original frames may be interposed between the reference original frames as the intermediate original frames.

Meanwhile, the above-described second embodiment includes the determination unit 244. However, it is not always necessary to provide the determination unit 244. For example, original frames which are not continuous with each other may be used as the reference original frames in a specific mode and the corrected original frames may be used, constantly, in a specific mode.

What is claimed is:

1. A display device configured to display a video image at multiple times an original frame rate by use of original frames and an interpolated frame, the display device comprising:
    a display unit including a plurality of pixels each including a plurality of sub-pixels;
    an acquisition unit configured to acquire a numbers of sub-pixels corresponding to an amount of motion of a target image between a plurality of reference original frames which are the original frames to be used for reference upon generation of the interpolated frame;
    an allocating unit configured to allocate the numbers of sub-pixels acquired by the acquisition unit to the interpolated frame, in accordance with an order of the interpolated frame to be interposed between the plurality of reference original frames; and
    a generating unit configured to generate the interpolated frame, in accordance with the numbers of sub-pixels allocated by the allocating unit.

2. The display device according to claim 1, wherein
    the allocating unit allocates the number of sub-pixels acquired by the acquisition unit to an intermediate original frame, in accordance with an order of the intermediate original frame, the intermediate original frame being one of the original frames interposed between the plurality of reference original frames, and
    the generating unit generates a corrected original frame corresponding to the intermediate original frame, in accordance with the numbers of sub-pixels allocated to the intermediate original frame.

3. The display device according to claim 2, further comprising a determination unit configured to determine whether to use the intermediate original frame or the corrected original frame, wherein
    the acquisition unit acquires a gap amount of the target image between the intermediate original frame and the corrected original frame,
    the determination unit determines to use the corrected original frame when the gap amount acquired by the acquisition unit is smaller than a predetermined threshold, and
    the determination unit determines to use the intermediate original frame when the gap amount acquired by the acquisition unit is larger than the predetermined threshold.

4. The display device according to claim 2, wherein
    the generating unit generates video image output signals for each of the plurality of pixels, based on video image input signals for each of the plurality of pixels,
    the generating unit adjusts the video image output signals of pixel corresponding to the target image included in the interpolated frame, based on the video image input signals of the pixel corresponding to the target image included in the interpolated frame.

5. A display method for displaying a video image at multiple times an original frame rate by use of original frames and an interpolated frame on a display device having a display unit including a plurality of pixels each including a plurality of sub-pixels, the display method comprising:
    a step A of acquiring the number of sub-pixels corresponding to an amount of motion of a target image between a plurality of reference original frames which are the original frames to be used for reference upon generation of the interpolated frame;
    a step B of allocating the numbers of sub-pixels acquired in the step A to the interpolated frame, in accordance with the order of the interpolated frame to be interposed between the plurality of reference original frames; and
    a step C of generating the interpolated frame in accordance with the numbers of sub-pixels allocated in the step B.

* * * * *